United States Patent
Malladi et al.

(10) Patent No.: US 10,070,272 B2
(45) Date of Patent: Sep. 4, 2018

(54) SHARED BROADCAST

(71) Applicant: QUALCOMM Incorporated, San Diego, CA (US)

(72) Inventors: Durga Prasad Malladi, San Diego, CA (US); Jun Wang, Poway, CA (US); Yongbin Wei, La Jolla, CA (US); Shimman Patel, San Diego, CA (US); Aleksandar Damnjanovic, Del Mar, CA (US); Miguel Griot, La Jolla, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/073,417

(22) Filed: Mar. 17, 2016

(65) Prior Publication Data

US 2016/0337817 A1 Nov. 17, 2016

Related U.S. Application Data

(60) Provisional application No. 62/162,491, filed on May 15, 2015.

(51) Int. Cl.
*H04W 4/06* (2009.01)
*H04W 72/00* (2009.01)
(Continued)

(52) U.S. Cl.
CPC ........... *H04W 4/06* (2013.01); *H04W 72/005* (2013.01); *H04L 12/189* (2013.01); *H04W 16/14* (2013.01)

(58) Field of Classification Search
CPC ..... H04W 4/06; H04W 72/005; H04W 16/14; H04L 12/189
See application file for complete search history.

(56) References Cited

U.S. PATENT DOCUMENTS

2006/0098567 A1* 5/2006 Willenegger ....... H04W 72/005
370/206
2008/0287057 A1* 11/2008 Zisimopoulos ..... H04W 72/005
455/3.01
(Continued)

OTHER PUBLICATIONS

Huawei: "eMBMS Stage 2 Description for Release 9", 3GPP Draft, R3-090800 MBMS Stage2 for Ran3, 3rd Generation Partnership Project (3GPP), Mobile Competence Centre; 650, Route Des Lucioles, F-06921 Sophia-Antipolis Cedex, France, No. Seoul, Korea, Mar. 18, 2009, Mar. 18, 2009 (Mar. 18, 2009), pp. 1-10, XP050341179, [retrieved on Mar. 18, 2009] the whole document.
(Continued)

*Primary Examiner* — Tejis Daya
(74) *Attorney, Agent, or Firm* — Arent Fox, LLP

(57) ABSTRACT

A method, an apparatus, and a computer-readable medium for delivering content to end user via shared broadcast are provided. The apparatus may be a UE that determines to acquire a MBMS service. The UE tunes to a frequency provided by a first MNO to which the UE is not a subscriber in order to receive the MBMS service via a carrier shared by the first MNO and at least one other MNO. The UE receives the MBMS service on the frequency via the carrier shared by the first MNO and the at least one other MNO. The shared carrier may have a common SFN timing with respect to the first MNO and the at least one other MNO. The shared carrier may include a shared MBMS SDL carrier. The shared carrier may include a standalone shared carrier for receiving the MBMS service and control information associated with the MBMS service.

8 Claims, 23 Drawing Sheets

(51) Int. Cl.
    *H04L 12/18*     (2006.01)
    *H04W 16/14*     (2009.01)

(56) References Cited

U.S. PATENT DOCUMENTS

| | | | | |
|---|---|---|---|---|
| 2010/0272004 | A1* | 10/2010 | Maeda | H04L 5/0007 |
| | | | | 370/312 |
| 2011/0021224 | A1* | 1/2011 | Koskinen | H04W 72/005 |
| | | | | 455/507 |
| 2012/0077466 | A1* | 3/2012 | O'Mahony | H04N 21/234327 |
| | | | | 455/414.1 |
| 2012/0170501 | A1* | 7/2012 | Drozt | H04W 72/005 |
| | | | | 370/312 |
| 2012/0213141 | A1 | 8/2012 | Damnjanovic | |
| 2012/0257562 | A1* | 10/2012 | Kim | H04W 4/06 |
| | | | | 370/312 |
| 2013/0195003 | A1* | 8/2013 | Lee | H04H 20/72 |
| | | | | 370/312 |
| 2014/0362756 | A1* | 12/2014 | Maeda | H04L 5/0007 |
| | | | | 370/312 |
| 2015/0119023 | A1* | 4/2015 | Wang | H04W 4/06 |
| | | | | 455/432.1 |
| 2017/0238149 | A1* | 8/2017 | Xu | H04W 4/06 |
| | | | | 370/312 |

OTHER PUBLICATIONS

International Search Report and Written Opinion—PCT/US2016/023277—ISA/EPO—dated Jun. 16, 2016.

* cited by examiner

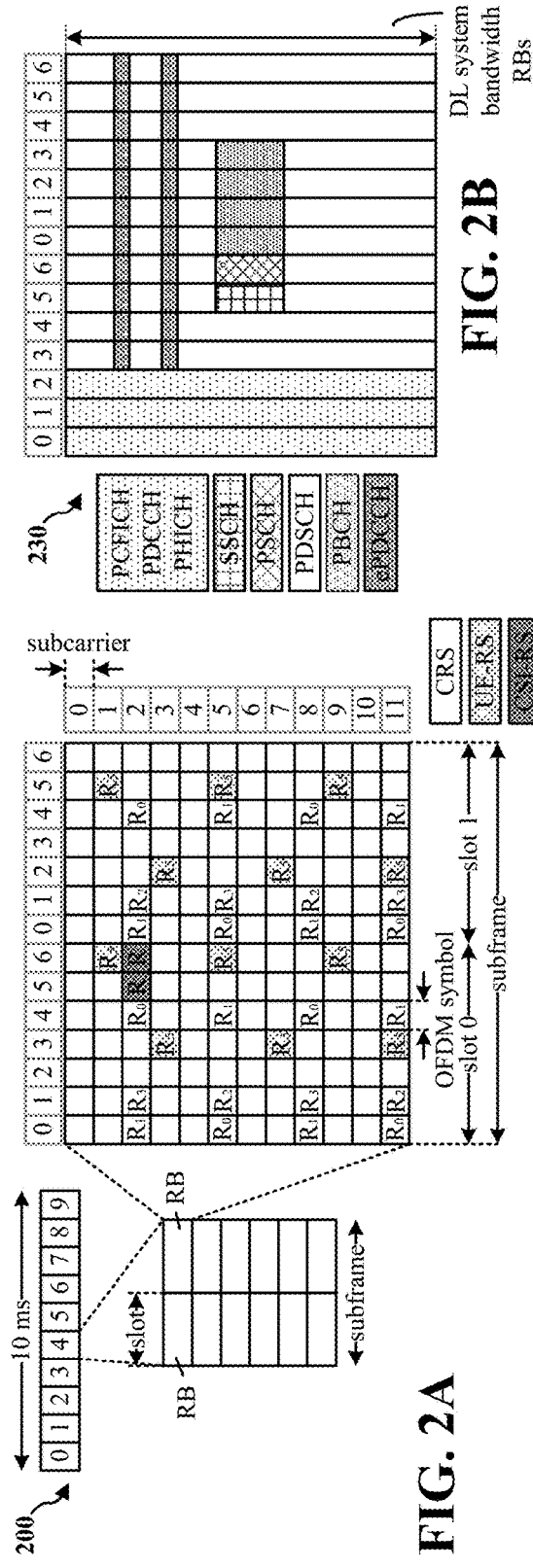
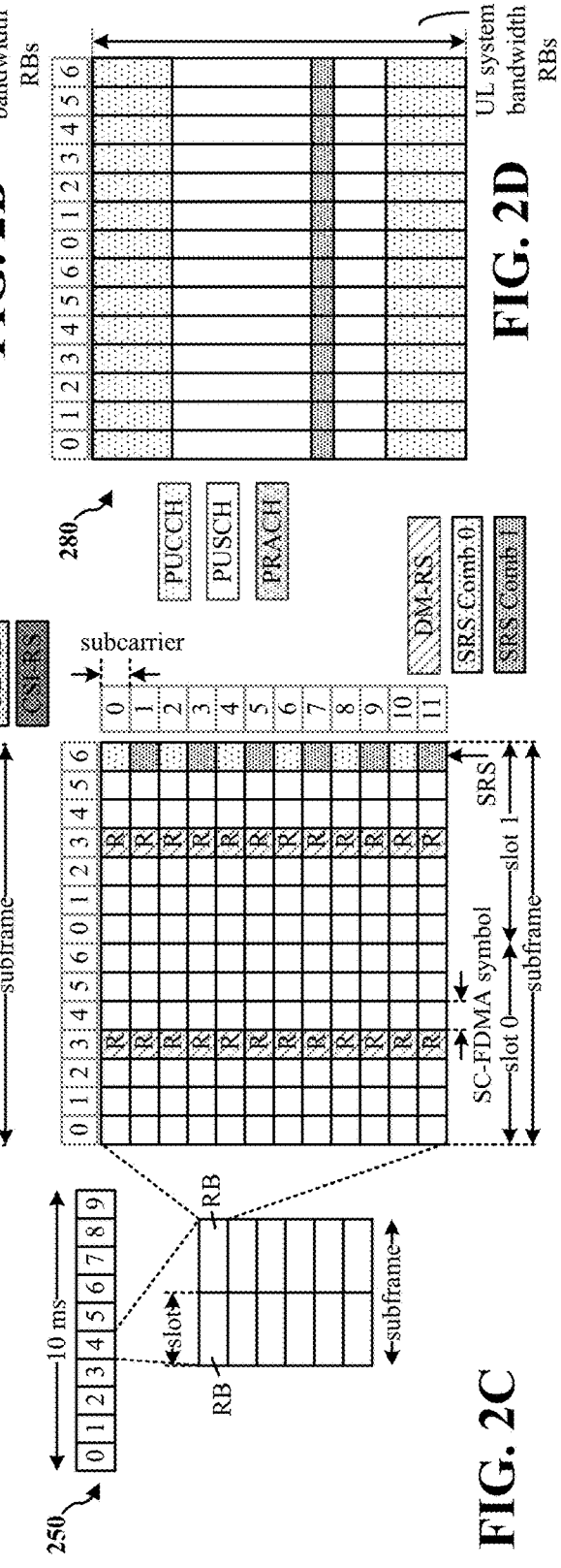
FIG. 2A
FIG. 2B
FIG. 2C
FIG. 2D

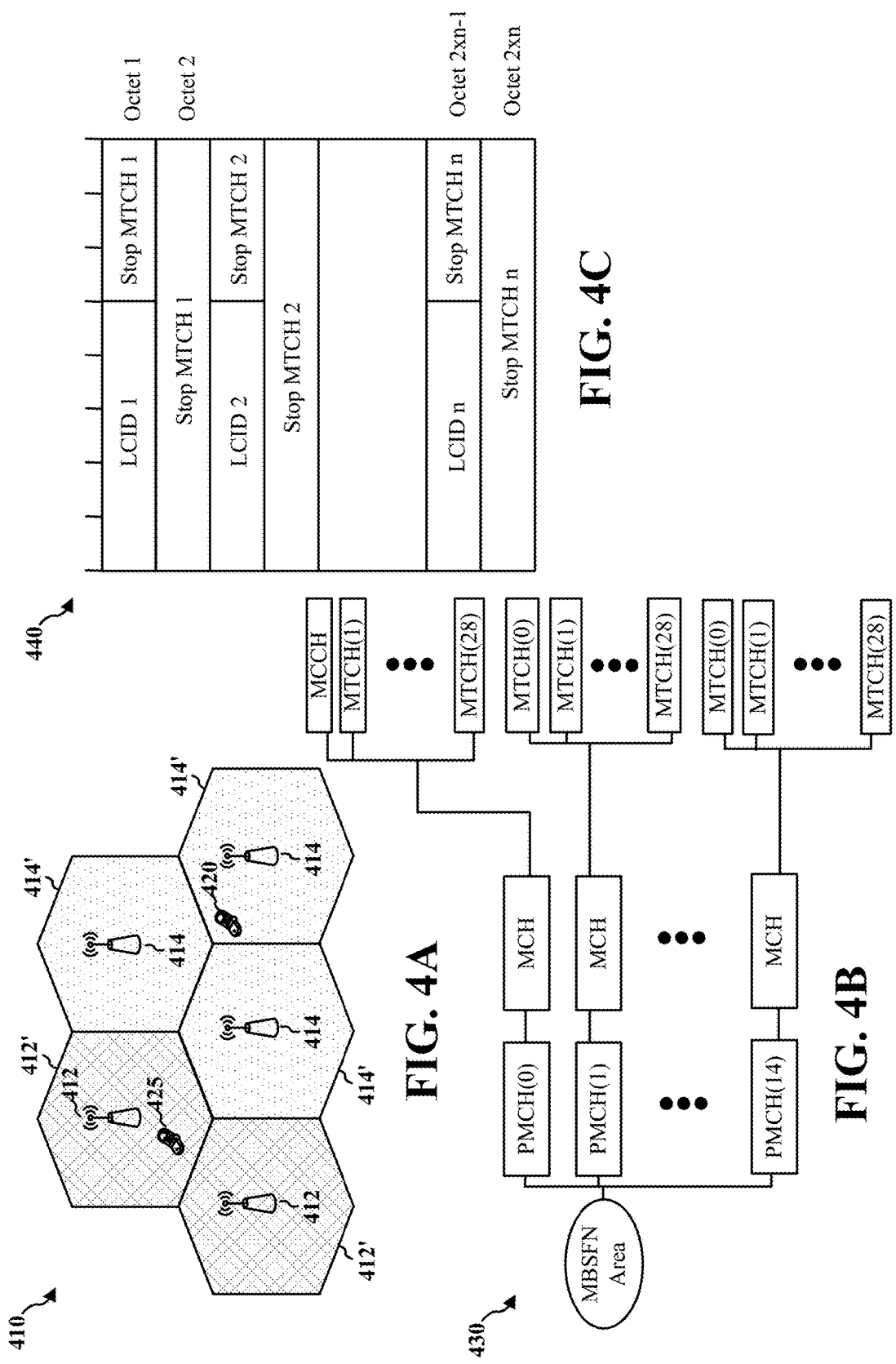

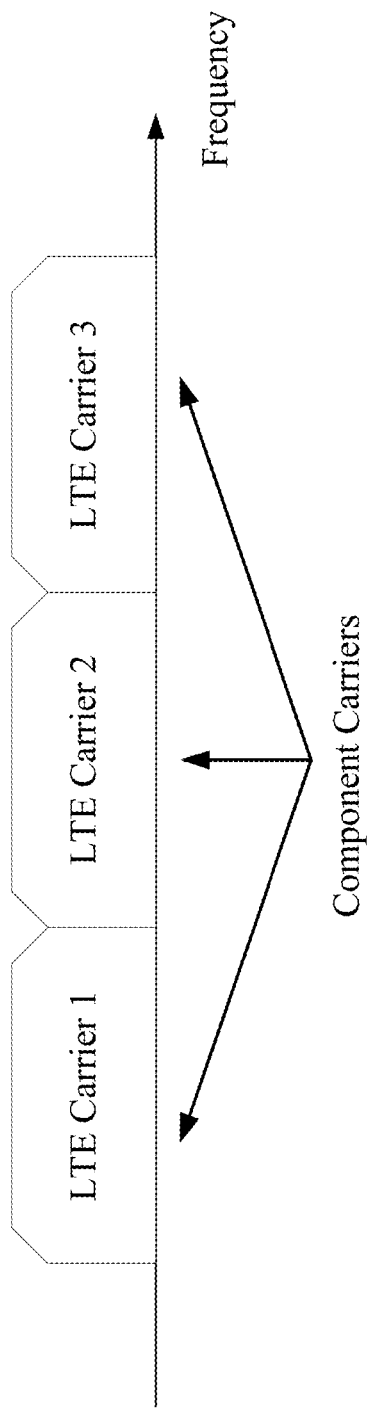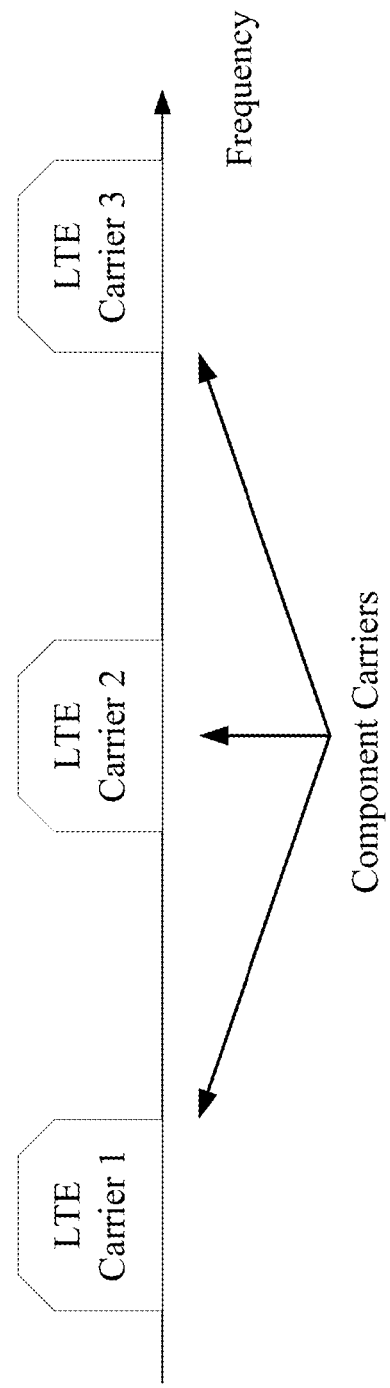
FIG. 5A
FIG. 5B

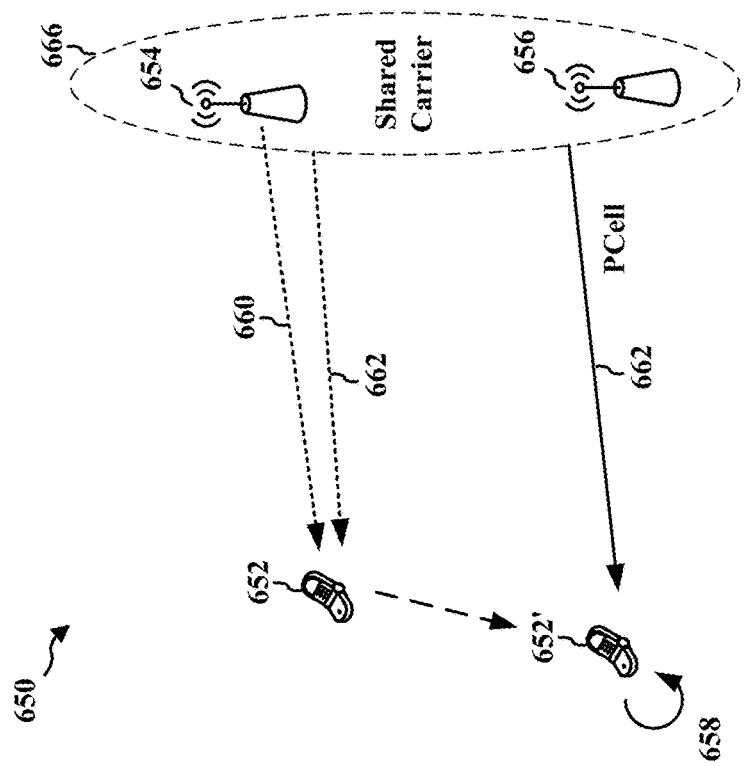
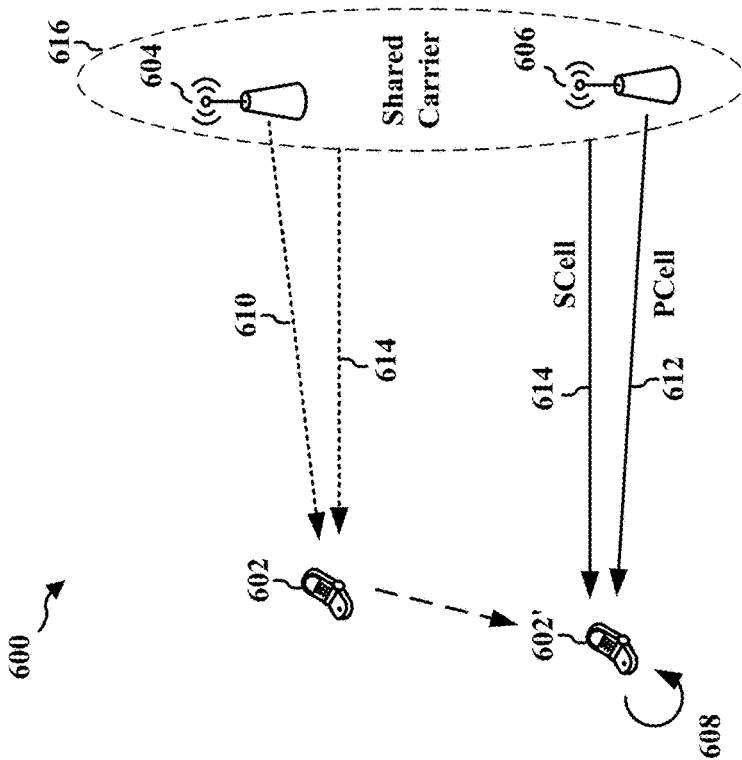
FIG. 6B
FIG. 6A

| LCID | Descriptions |
|---|---|
| 00000 | MCCH (see note) |
| 00001-11100 | MTCH |
| 11101 | Reserved |
| 11110 | MCH Scheduling Information |
| 11111 | Padding |
| NOTE: If there is no MCCH on MCH, an MTCH could use this value. | |

1450

| | |
|---|---|
| LCID 1 | Stop MTCH 1 | Octet 1
| Stop MTCH 1 | | Octet 2
| LCID 2 | Stop MTCH 2 | Octet 3
| Stop MTCH 2 | | Octet 4
| ... | | |
| LCID n | Stop MTCH n | Octet 2*n-1
| Stop MTCH n | | Octet 2*n

SHARED BROADCAST

CROSS-REFERENCE TO RELATED APPLICATION

This application claims the benefit of U.S. Provisional Application Ser. No. 62/162,491, entitled "SHARED BROADCAST" and filed on May 15, 2015, which is expressly incorporated by reference herein in its entirety.

BACKGROUND

Field

The present disclosure relates generally to communication systems, and more particularly, to a shared Multimedia Broadcast Multicast Service (MBMS) service.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Traditionally, an end user needs mobile network operator (MNO) subscriptions to receive content on the MNO owned carrier. Without a subscription to the MNO, the end user will not able to receive content on the MNO owned carrier.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication are provided. The apparatus may be a UE. The UE determines to acquire a MBMS service. The UE tunes to a frequency provided by a first MNO to which the UE is not a subscriber in order to receive the MBMS service via a carrier shared by the first MNO and at least one other MNO. The UE receives the MBMS service on the frequency via the carrier shared by the first MNO and the at least one other MNO.

In one configuration, the shared carrier includes a shared MBMS SDL carrier. The UE further receives control information for the MBMS service through a PCell of the first MNO. The MBMS service is received through a SCell shared by the first MNO and the at least one other MNO. The UE acquires a SIB indicating the frequency and a bandwidth associated with the shared MBMS SDL carrier. The UE tunes to the frequency based on the acquired SIB. The UE acquires a SIB indicating an allocation of MBSFN subframes for the SCell. The MBMS service is received based on the indicated MBSFN subframes in the acquired SIB. The UE acquires a SIB indicating a time offset between the PCell and the SCell. The MBMS service is received based on the indicated time offset in the acquired SIB. The UE receives a SIB13 and a PDCCH notification on the shared MBMS SDL carrier from the PCell. The MBMS service is received based on the received SIB13 and the PDCCH notification.

In another configuration, the shared carrier includes a standalone shared carrier for receiving the MBMS service and control information associated with the MBMS service. The UE may receive a frame timing and a SIB via the standalone shared carrier without having previously received a PSS and a SSS via the standalone shared carrier. In order to receive the frame timing and the SIB without having previously received the PSS and the SSS, the UE receives a MBSFN ID, receives a SIB and RS (the RS are scrambled based on the MBSFN ID), establishes the frame timing based on the received SIB and the RS, and decodes the SIB upon establishing the frame timing.

In one configuration, an apparatus for wireless communication is provided. The apparatus may be a UE. The apparatus may include means for determining to acquire a MBMS service, means for tuning to a frequency provided by a first MNO to which the UE is not a subscriber in order to receive the MBMS service via a carrier shared by the first MNO and at least one other MNO, and means for receiving the MBMS service on the frequency via the carrier shared by the first MNO and the at least one other MNO.

In one configuration, the apparatus may further include means for receiving control information for the MBMS service through a PCell of the first MNO, wherein the MBMS service is received through a SCell shared by the first MNO and the at least one other MNO. In one configuration, the apparatus may further include means for acquiring a SIB indicating the frequency and a bandwidth associated with the shared MBMS SDL carrier. In such a configuration, the means for tuning may be configured based on the acquired SIB. In one configuration, the apparatus may further include means for acquiring a SIB indicating an allocation of MBSFN subframes for the SCell. In such a configuration, the MBMS service may be received based on the indicated MBSFN subframes in the acquired SIB. In one configuration, the apparatus may further include means for acquiring a SIB indicating a time offset between the PCell and the SCell. In such a configuration, the MBMS service may be received based on the indicated time offset in the acquired SIB. In one configuration, the apparatus may further include means for receiving a SIB 13 and a PDCCH notification on the shared MBMS SDL carrier from the PCell. In such a configuration, the MBMS service may be received based on the received SIB 13 and the PDCCH notification. In one configuration, the apparatus may further include means for receiving information regarding the shared MBMS SDL carrier through an Internet Protocol (IP) connection. In such a configuration, the means for tuning and the means for receiving are configured based on the received information regarding the shared MBMS SDL carrier.

In one configuration, the apparatus may further include means for receiving a frame timing and a SIB via the standalone shared carrier without having previously received a PSS and a SSS via the standalone shared carrier. In one configuration, the means for receiving the frame timing and the SIB without having previously received the PSS and the SSS may be configured to: receive a MBSFN ID, receive, via the standalone shared carrier in an MBSFN subframe, a SIB and reference signals (RS), the RS scrambled based on the MBSFN ID, establish the frame timing based on the received SIB and the RS, and decode the SIB upon establishing the frame timing. In one configuration, the means for receiving the frame timing and the SIB without having previously received the PSS and the SSS may be configured to: receive, via the standalone shared carrier in an MBSFN subframe, a SIB and RS, the RS scrambled based on the MBSFN ID, establish the frame timing based on the received SIB and the RS with different MBSFN ID hypotheses, and decode the SIB and detecting MBSFN ID upon establishing the frame timing.

In one configuration, the apparatus may further include means for receiving information associated with the MBMS service via limited unicast communication with the first MNO. In such a configuration, the MBMS service may be received based on the received information.

In one configuration, a computer-readable medium storing computer executable code for wireless communication is provided. The computer-readable medium may include code for: determining to acquire a MBMS service, tuning to a frequency provided by a first MNO to which a UE is not a subscriber in order to receive the MBMS service via a carrier shared by the first MNO and at least one other MNO, and receiving the MBMS service on the frequency via the carrier shared by the first MNO and the at least one other MNO.

In one aspect of the disclosure, a method, a computer program product, and an apparatus for wireless communication are provided. The apparatus may be a base station. The base station provisions a MBMS service on a frequency provided by a first MNO via a carrier shared by the first MNO and at least one other MNO. The base station provides control information for acquiring the MBMS service. The base station provides the MBMS service on the frequency via the carrier shared by the first MNO and the at least one other MNO.

In one configuration, an apparatus for wireless communication is provided. The apparatus may include means for provisioning a MBMS service on a frequency provided by a first MNO via a carrier shared by the first MNO and at least one other MNO, means for providing control information for acquiring the MBMS service, and means for providing the MBMS service on the frequency via the carrier shared by the first MNO and the at least one other MNO. In one configuration, the means for providing the control information may be configured to transmit a SIB indicating the frequency and a bandwidth associated with the shared MBMS SDL carrier.

In one configuration, the means for providing the control information may be configured to transmit a SIB indicating an allocation of MBSFN subframes for the SCell. In such a configuration, the MBMS service may be provided based on the indicated MBSFN subframes in the transmitted SIB. In one configuration, the means for providing the control information may be configured to transmit a SIB indicating a time offset between the PCell and the SCell. In such a configuration, the MBMS service may be provided based on the indicated time offset in the transmitted SIB. In one configuration, the means for providing the control information may be configured to transmit a SIB 13 and a PDCCH notification on the shared MBMS SDL carrier through the PCell. In such a configuration, the MBMS service may be provided based on the transmitted SIB 13 and the PDCCH notification.

In one configuration, the means for providing the control information may be configured to transmit a frame timing and a SIB via the standalone shared carrier without having previously transmitted a PSS and a SSS via the standalone shared carrier. In one configuration, the means for transmitting the frame timing and the SIB without having previously transmitted the PSS and the SSS may be configured to: receive a MBSFN ID, and transmit periodically, via the standalone shared carrier in an MBSFN subframe relative to a fixed fame timing, a SIB and RS, the RS scrambled based on the MBSFN ID.

In one configuration, the means for provisioning the MBMS service may be configured to provide information associated with the MBMS service via limited unicast communication provided by the first MNO. In one configuration, the apparatus may further include means for receiving a request for the MBMS service from a UE. In such a configuration, the UE is not a subscriber to the first MNO.

In one configuration, a computer-readable medium storing computer executable code for wireless communication is provided. The computer-readable medium may include code for: provisioning a MBMS service on a frequency provided by a first MNO via a carrier shared by the first MNO and at least one other MNO, providing control information for acquiring the MBMS service, and providing the MBMS service on the frequency via the carrier shared by the first MNO and the at least one other MNO.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

FIG. 4A is a diagram illustrating an example of Multicast Broadcast Single Frequency Network areas in an access network.

FIG. 4B is a diagram illustrating an example of an evolved Multimedia Broadcast Multicast Service channel configuration in a Multicast Broadcast Single Frequency Network.

FIG. 4C is a diagram illustrating a format of a Multicast Channel (MCH) Scheduling Information (MSI) Medium Access Control control element.

FIG. 5A is a diagram illustrating an example of continuous carrier aggregation.

FIG. 5B is a diagram illustrating an example of non-continuous carrier aggregation.

FIG. 6A is a diagram illustrating an example of shared broadcast network using a shared carrier as secondary cell.

FIG. 6B is a diagram illustrating an example of shared broadcast network using a shared carrier as standalone primary cell.

FIG. 14 is a diagram illustrating an example of MSI MAC control element and a table illustrating possible values of the logical channel id field within the MSI MAC control element.

DETAILED DESCRIPTION

Figure 1:
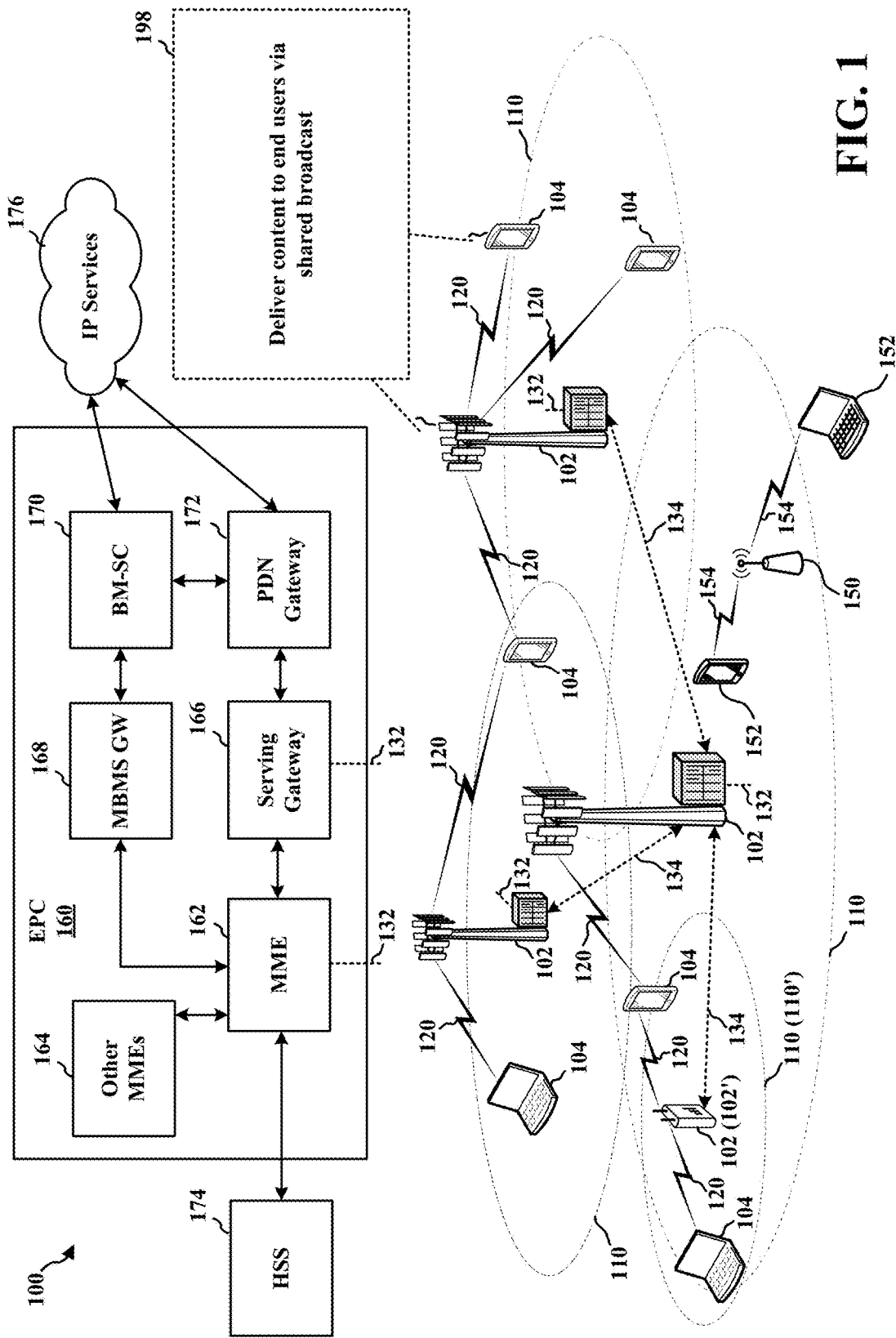
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 102 may be configured to deliver (198) content to end user via shared broadcast. Details of the operations performed at 198 are described below with reference to FIGS. 6-23.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
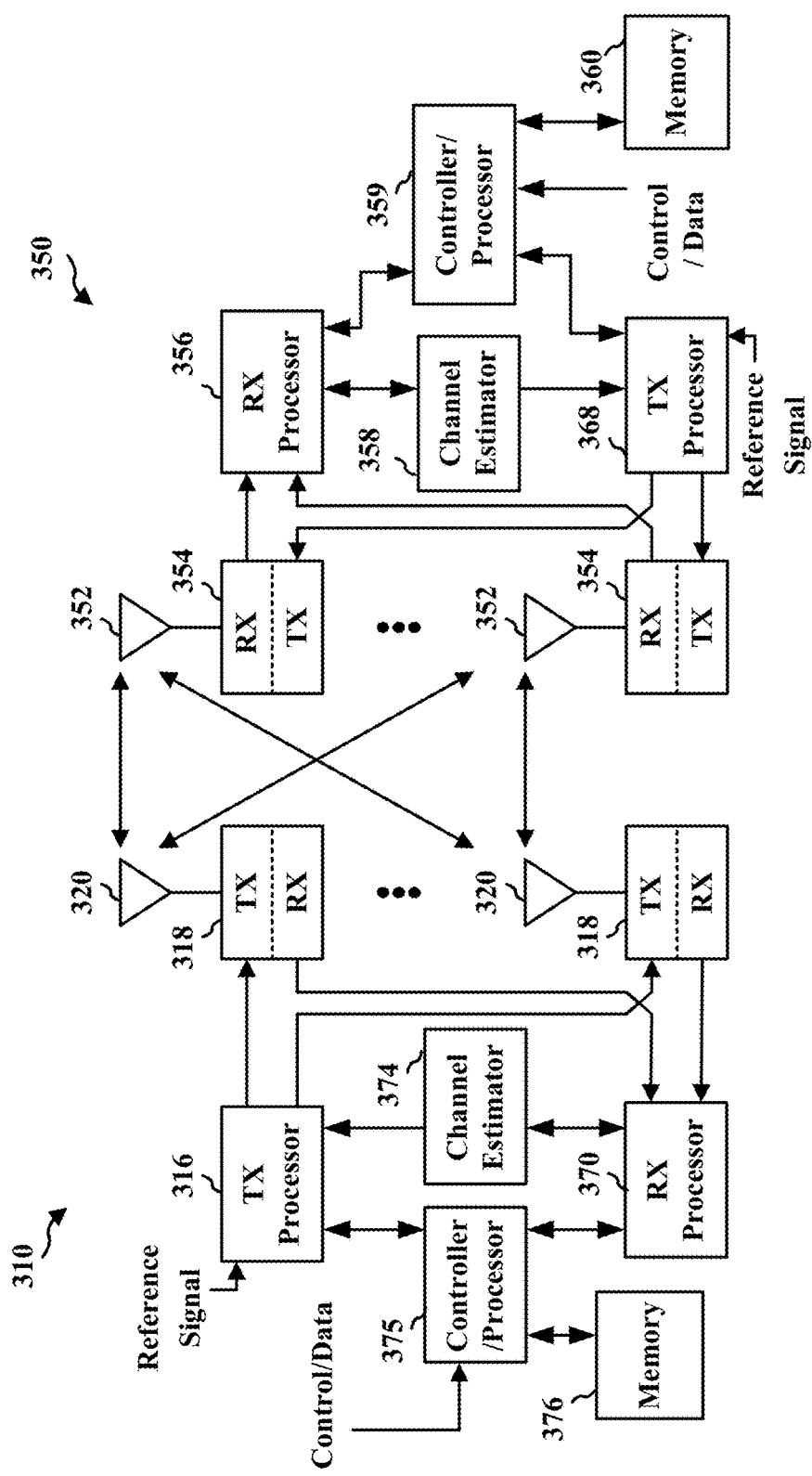
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

FIG. 4A is a diagram 410 illustrating an example of MBSFN areas in an access network. The eNBs 412 in cells 412' may form a first MBSFN area and the eNBs 414 in cells 414' may form a second MBSFN area. The eNBs 412, 414 may each be associated with other MBSFN areas, for example, up to a total of eight MBSFN areas. A cell within an MBSFN area may be designated a reserved cell. Reserved cells do not provide multicast/broadcast content, but are time-synchronized to the cells 412', 414' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 4A, the first MBSFN area may support a first eMBMS broadcast service, such as by providing a particular news broadcast to UE 425. The second MBSFN area may support a second eMBMS broadcast service, such as by providing a different news broadcast to UE 420.

FIG. 4B is a diagram 430 illustrating an example of an eMBMS channel configuration in an MBSFN. As shown in FIG. 4B, each MBSFN area supports one or more physical multicast channels (PMCH) (e.g., 15 PMCHs). Each PMCH corresponds to an MCH. Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a SIB 13 (SIB13). Subsequently, based on the SIB13, the UE may acquire an MBSFN Area Configuration message on an MCCH. Subsequently, based on the MBSFN Area Configuration message, the UE may acquire an MSI MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted. A particular TMGI identifies a particular service of available MBMSs services.

FIG. 4C is a diagram 440 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCID) field (e.g., LCID 1, LCID 2, . . . , LCID n) may indicate a logical channel identifier of the MTCH. A Stop MTCH field (e.g., Stop MTCH 1, Stop MTCH 2, . . . , Stop MTCH n) may indicate the last subframe carrying the MTCH corresponding to the particular LCID.

FIG. 5A discloses a continuous carrier aggregation type. FIG. 5B discloses a non-continuous carrier aggregation type. UEs may use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments conserve spectrum and are a good fit for the typically asymmetric bandwidth utilization by broadband subscribers. Two types of carrier aggregation (CA) methods have been proposed, continuous CA and non-continuous CA. The two types of CA methods are illustrated in FIGS. 5A and 5B. Non-continuous CA occurs when multiple available component carriers are separated along the frequency band (FIG. 5B). On the other hand, continuous CA occurs when multiple available component carriers are adjacent to each other (FIG. 5A). Both non-continuous and continuous CA aggregates multiple LTE/component carriers to serve a single UE. The component carriers may include a primary component carrier and one or more secondary component carriers. A primary component carrier may be referred to as a primary cell (PCell) and a secondary component carrier may be referred to as a secondary cell (SCell).

Traditionally, a UE needs mobile network operator (MNO) subscriptions to receive eMBMS on the MNO owned carrier. A method to deliver the content to end users via several service providers/MNOs with or without subscriptions is desirable. In one configuration, this disclosure describes a single-frequency network (SFN) broadcast of content over a shared carrier to be received by any end users regardless of its MNO subscriptions. This shared broadcast network uses radio resources more efficiently and enables efficient delivery of broadcast TV over MBSFN in shared licensed spectrum or unlicensed spectrum.

In one configuration, a shared carrier may be used to deliver eMBMS so that non-subscriber UEs (or other MNOs' UEs) can access the shared carrier to receive eMBMS. The shared carrier may be a shared dedicated MBMS carrier (e.g., a SDL carrier) or a shared standalone carrier. In one configuration, the shared dedicated MBMS carrier or standalone carrier may be accessed by any UEs. In one configuration, MBMS access and reception control may be enabled for a MNO if the MNO wants to control its subscribers' access to the MBMS service and/or prevent non-subscribers from accessing the MBMS service via the MNO's pipe. In one configuration, 3GPP limited unicast access through MNO may be enabled for MBMS provisioning or interactive service In one configuration, content providers may have agreement with a MNO to carry content in a shared spectrum (or shared frequency band) that is open to all UEs that may or may not have a subscription with the MNO to receive the content to facilitate a shared broadcast of the content. In one configuration, a dedicated frequency band may carry broadcast TV over eMBMS that can be accessed by all UEs having the capability to receive eMBMS services regardless the MNO subscriptions of each UE. For example, in this configuration, a Europe UHF 700 MHz band for broadcast TV may be used to facilitate the shared broadcast of content. In one configuration, an unlicensed frequency band or a frequency band owned by a broadcaster may be used to carry eMBMS (e.g., a sports event, various camera angles of a sports event in a stadium setting). In such a configuration, the content should be accessible by all UEs that may or may not have a corresponding MNO subscription. In one configuration, the shared broadcast network may be used for public safety and emergency services over eMBMS. In such a configuration, the services should be accessible by all UEs that may or may not have a subscription to the corresponding MNO.

In one configuration, the shared broadcast network delivers content to end users via a plurality of service providers. In one configuration, the shared broadcast network is a SFN broadcast of content (e.g., mobile HDTV) over a shared carrier. The shared carrier may have a common SFN timing across the MNOs. In one configuration, the shared carrier may be a shared unlicensed carrier. In one configuration, the shared carrier may be a licensed carrier.

FIG. 6A is a diagram 600 illustrating an example of a shared broadcast network using a shared carrier provided by a SCell. In diagram 600, there are two base stations 604 and 606 operated by two different MNOs, respectively. Each of the two MNOs has carriers in distinct frequency bands that are not shared. In addition, the two MNOs use a shared carrier 616.

A UE 602 has subscription to the MNO that operates the base station 604. In one configuration, when the UE 602 is within the coverage area of the base station 604, the UE 602 may receive MBMS service from the base station 604 via a frequency 610 provided by the MNO operating the base station 604. In another configuration, when the UE 602 is within the coverage area of the base station 604, the UE 602 may receive MBMS service from the base station 604 via a frequency 614 provided by the shared carrier 616.

When the UE 602 moves out of the coverage area of the base station 604 and moves within the coverage area of the base station 606, the UE 602 is identified as UE 602'. The UE 602' does not have subscription to the MNO that operates the base station 606. However, the UE 602' may tune to the base station 606 (through action 608) to receive MBMS service. To receive MBMS service from the base station 606, the UE 602' receives MBMS control information from the base station 606 via a frequency 612 provided by the MNO operating the base station 606 as a primary cell (PCell), and receives MBMS service from the base station 606 via the frequency 614 provided by the shared carrier 616 provided by a SCell. The PCell offers limited access to the UE 602' even though the UE 602' does not have subscription to the MNO operating the PCell. The UE 602' may tune to the PCell to get control information from the PCell and then tunes to the shared carrier 616. In one configuration, the service sent over the shared carrier 616 may be encrypted at a content level to prevent unauthorized UEs from receiving MBMS service via the shared carrier 616.

FIG. 6B is a diagram 650 illustrating an example of a shared broadcast network using a shared carrier provided by a standalone PCell. In diagram 650, there are two base stations 654 and 656 operated by two different MNOs, respectively. The two MNOs provide carriers that are not shared. In addition, the two MNOs share a common carrier 666.

A UE 652 has subscription to the MNO that operates the base station 654. In one configuration, when the UE 652 is within the coverage area of the base station 654, the UE 652 may receive MBMS service from the base station 654 via a frequency 660 provided by the MNO operating the base station 654. In another configuration, when the UE 652 is within the coverage area of the base station 654, the UE 652 may receive MBMS service from the base station 654 via a frequency 662 provided by the shared carrier 666.

When the UE 652 moves out of the coverage area of the base station 654 and moves within the coverage area of the base station 656, the UE 652 is identified as UE 652'. The UE 652' does not have a subscription to the MNO that operates the base station 656. However, the UE 602' may tune to the base station 656 (through action 658) to receive MBMS service. To receive MBMS service from the base station 656, the UE 652' receives MBMS control information and MBMS service from the base station 656 via the frequency 662 of the shared carrier 666 provided by the standalone PCell.

Figure 7:
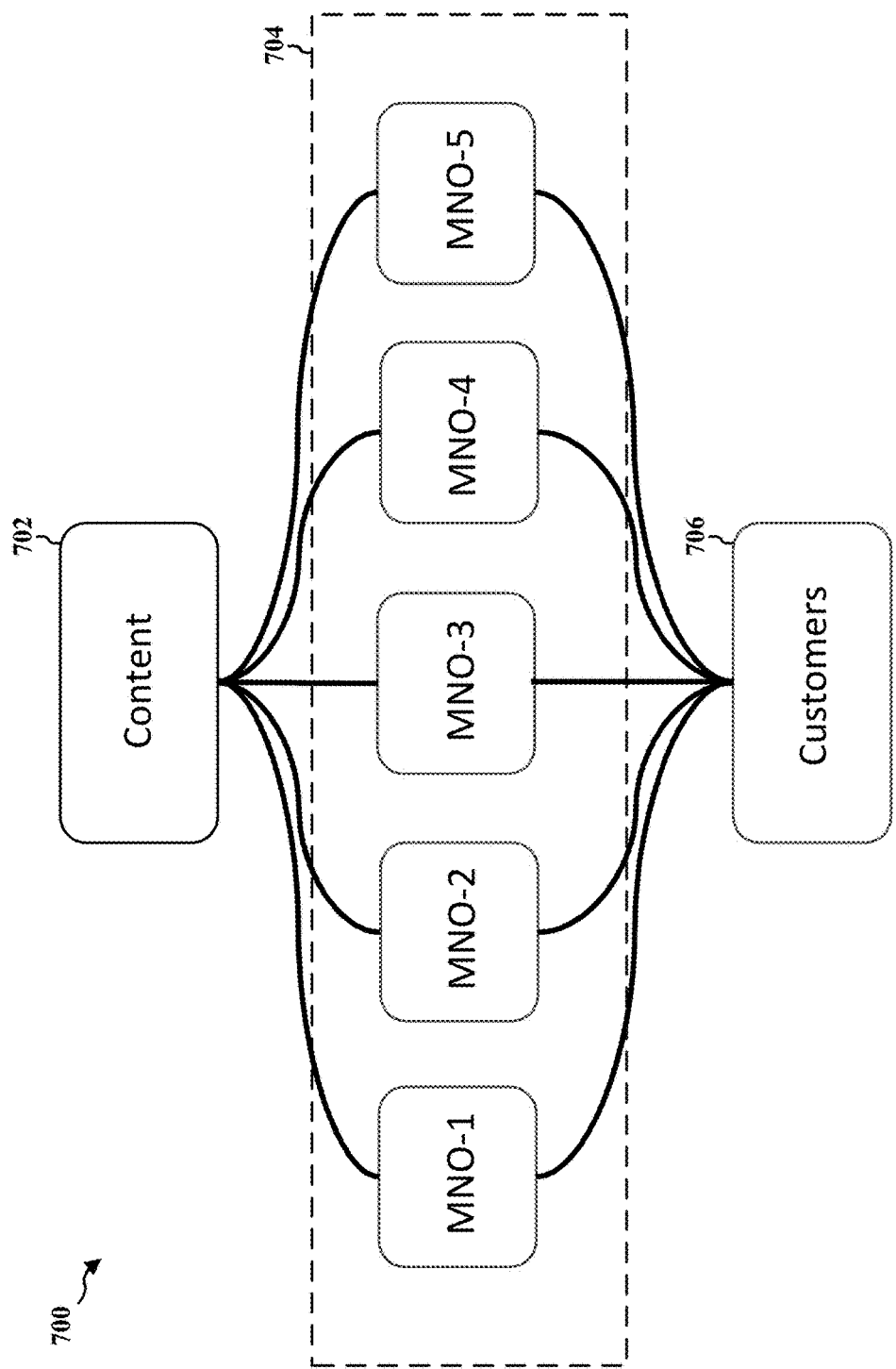
FIG. 7 is a diagram illustrating an example of broadcast TV or mobile HDTV through a shared broadcast network.

FIG. 7 is a diagram 700 illustrating an example of broadcast TV or mobile HDTV through a shared broadcast network. The content 702 may be distributed to the customers 706 via a carrier 704 shared by several MNOs (e.g., MNO 1-5). The customers 706 may be served by all MNOs (e.g., MNO 1-5) over the shared carrier 704 regardless their nominal cellular subscription. This is different from the traditional approach of mobile broadcast, where customers are served by their respective MNOs consistent with their nominal cellular subscription.

Figure 8:
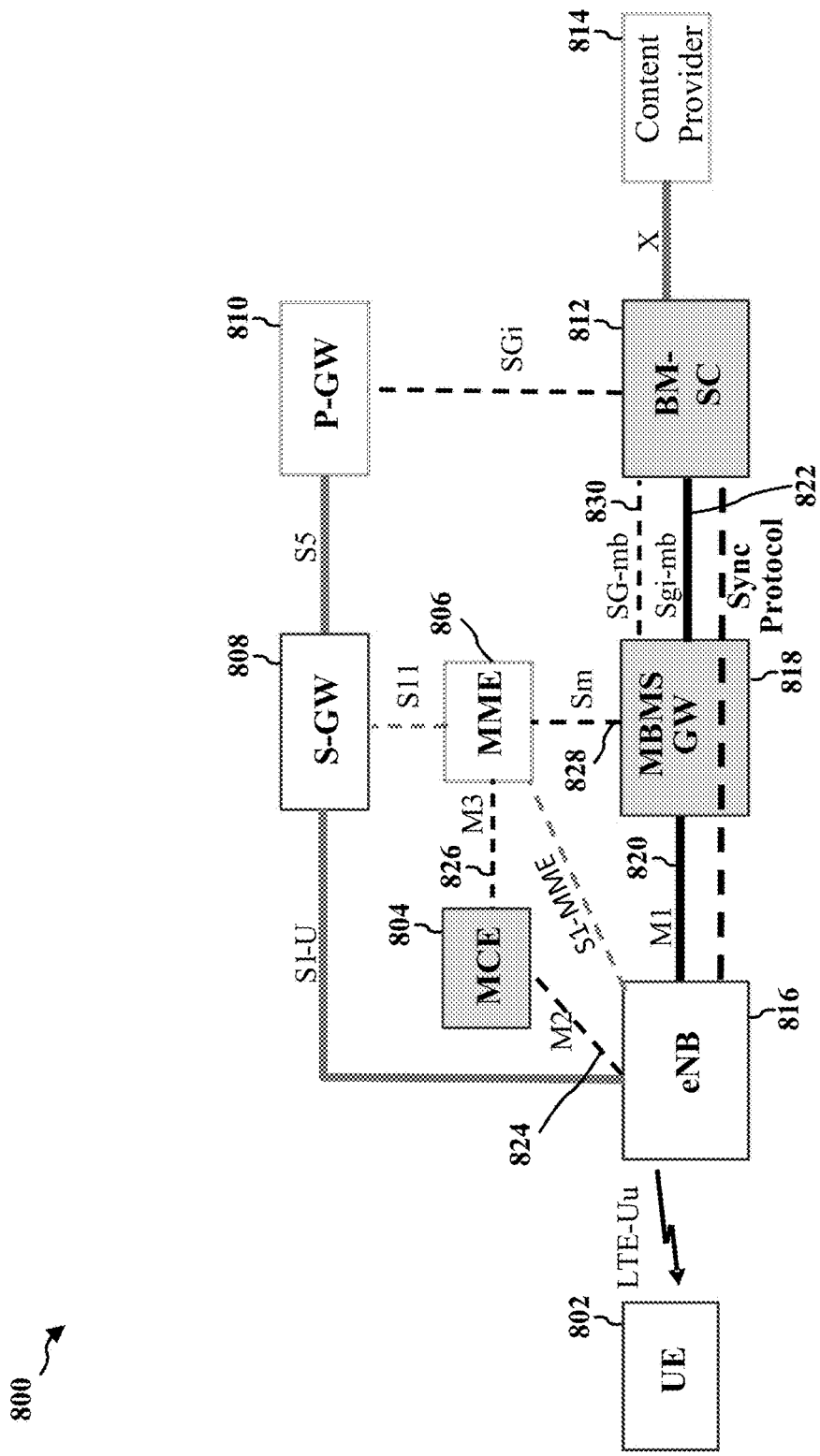
FIG. 8 is a diagram illustrating an example of a shared broadcast network architecture.

FIG. 8 is a diagram 800 illustrating an example of a shared broadcast network architecture. Specifically, diagram 800 shows an example of leveraging a traditional MBMS architecture and service layer for a shared broadcast network. As illustrated, the shared broadcast network architecture includes an eNB 816, a MBMS Gateway 818, a BM-SC 812, a MCE 804, a MME 806, a serving gateway 808, and a PDN gateway 810. The content provider 814 may provide MBMS service to the UE 802 through this shared broadcast network architecture.

The content provider 814 can share BM-SC 812, MBMS Gateway 818, and MCE 804 or eNBs (e.g., 816) with one or more cellular operators or build its own network. For example and in one configuration, content is sent over an eMBMS channel provided by a SCell or a standalone PCell in a shared frequency spectrum. The shared frequency spectrum can be accessed by subscribers to any of the MNOs and also by subscribers without any subscriptions to an MNO. In one configuration, MBMS user traffic may go through link 820 (between the eNB 816 and the MBMS Gateway 818) and link 822 (between the MBMS Gateway 818 and the BM-SC 812). In one configuration, the MBMS signaling is performed by link 824 (between the eNB 816 and the MCE 804), link 826 (between the MCE 804 and the MME 806), link 828 (between the MME 806 and the MBMS Gateway 818), and link 830 (between the MBMS Gateway 818 and the BM-SC 812).

Figure 9:
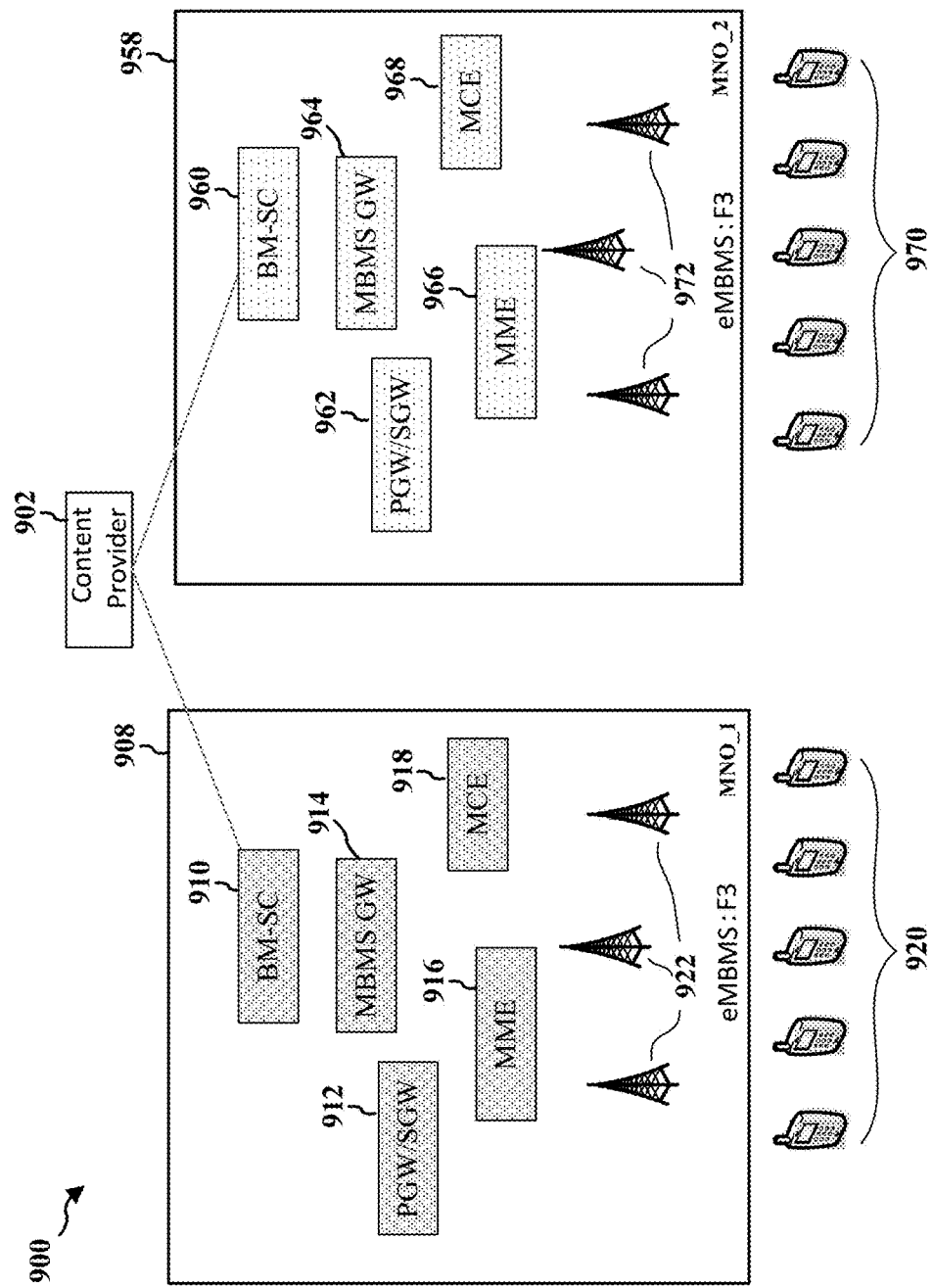
FIG. 9 is a diagram illustrating an example of leveraging traditional Multimedia Broadcast Multicast Service architecture and service layer for a shared broadcast network.

FIG. 9 is a diagram 900 illustrating an example of leveraging a traditional MBMS architecture and service layer for a shared broadcast network. In one configuration, the content provider 902 may provide content via a shared broadcast by using the BM-SC, MBMS Gateway, MME, and MCE/eNBs with one or more cellular operators. For example, in one configuration, the content is sent over eMBMS over MNO network 908 (MNO_1) through a shared carrier F3 to reach UEs 920 in one geographical area and over MNO network 958 (MNO_2) through the shared carrier F3 to reach UEs 970 in another geographical area. The MNO network 908 may include a BM-SC 910, a MBMS Gateway 914, a PDN/Serving Gateway 912, a MME 916, a MCE 918, and several base stations 922. The MNO network 908 may provide unicast services on F1. The MNO network 958 may include a BM-SC 960, a MBMS Gateway 964, a PDN/Serving Gateway 962, a MME 966, a MCE 968, and several base stations 972. The MNO network 958 may provide unicast services on F2. The UEs 920 and 970 may include UEs subscribed to the MNO network 908, UEs subscribed to the MNO network 958, UEs subscribed to other MNO networks, and/or UEs that have no cellular subscription to any MNO. All the UEs can access shared carrier F3 to receive eMBMS services.

In one configuration, the MNOs 908 and 958 disable MBMS service protection. In one configuration, the broadcast content sent on the shared carrier F3 can also be accessed by subscribers of other MNOs and subscribers without any subscriptions to an MNO. In one configuration, the shared carrier F3 can be a supplemental downlink (SDL) carrier or a standalone carrier.

Figure 10:
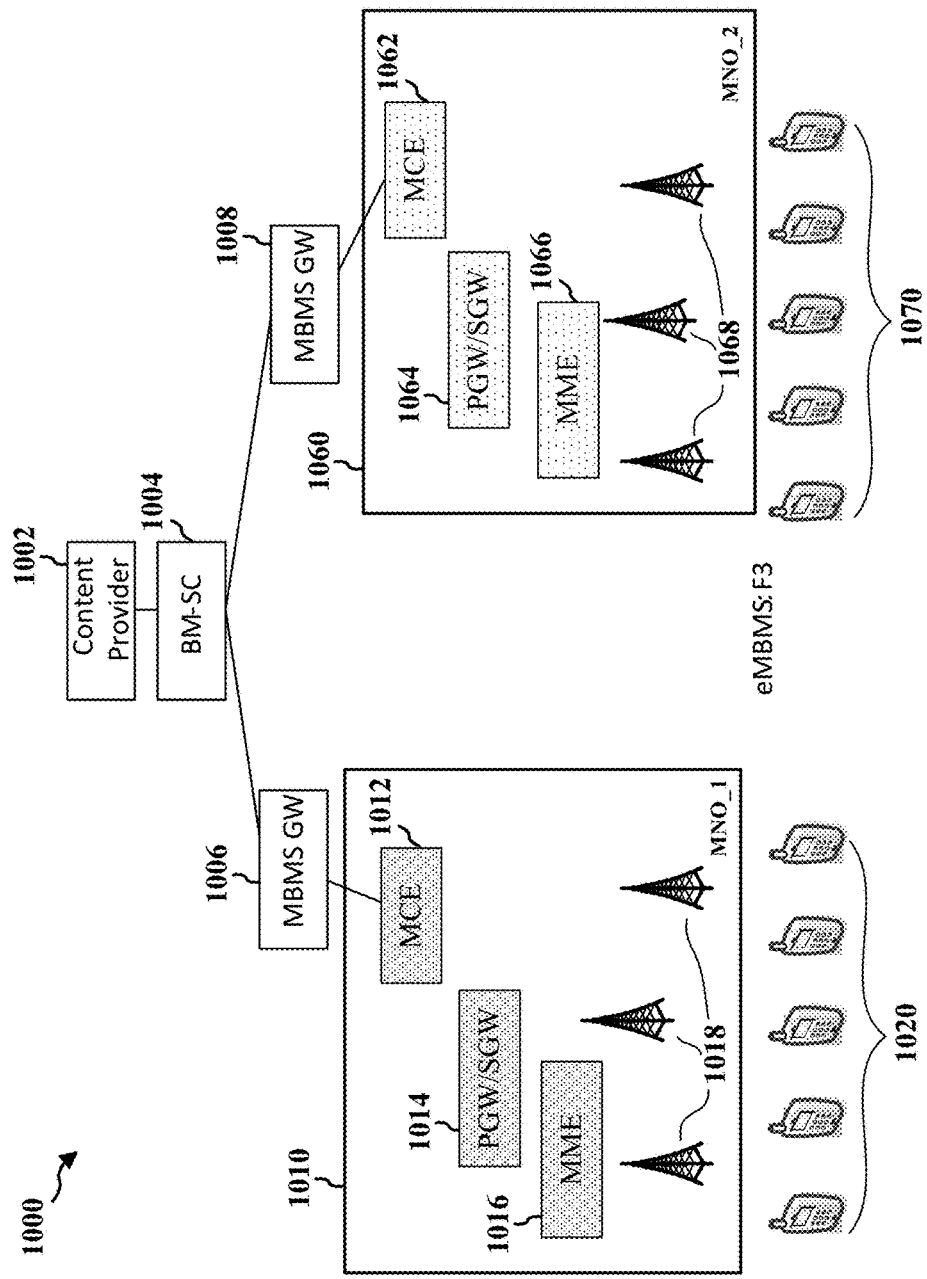
FIG. 10 is a diagram illustrating another example of how a traditional Multimedia Broadcast Multicast Service architecture and service layer can be leveraged for a shared broadcast network.

FIG. 10 is a diagram 1000 illustrating another example of how a traditional MBMS architecture and service layer can be leveraged for a shared broadcast network. In one configuration, a core network (such as BM-SC 1004, MBMS Gateways 1006 and 1008) may be owned by a content provider or a third party 1002. The core network may share MCE/eNBs provided by one or more cellular operators. For example and in one configuration, content is sent over eMBMS over MNO network 1010 (MNO_1) via a shared carrier F3 to provide service to UEs 1020 in one area and over MNO network 1060 (MNO_2) via the shared carrier F3 to provide service to UEs 1070 in another area. The MNO network 1010 may include a PDN/Serving Gateway 1014, a MME 1016, a MCE 1012, and several base stations 1018. The MNO network 1010 may provide unicast services on F1. The MNO network 1060 may include a PDN/Serving Gateway 1064, a MME 1066, a MCE 1062, and several base stations 1068. The MNO network 1060 may provide unicast services on F2. The UEs 1020 and 1070 may include UEs subscribed to the MNO network 1010, UEs subscribed to the MNO network 1060, UEs subscribed to other MNO networks, and/or UEs that have no cellular subscription to any MNO. All the UEs can access shared carrier F3 to receive eMBMS services. In one configuration, the shared broadcast network can be a MBSFN that spans (covers) a plurality of MNOs.

In one configuration, the content provider or the third party 1002 can enable service protection. In one configuration, the broadcast content sent on the shared carrier F3 can also be accessed by subscribers from other MNOs and subscribers without any subscriptions to an MNO. In one configuration, the shared carrier F3 can be a SDL carrier or a standalone carrier.

Figure 11:
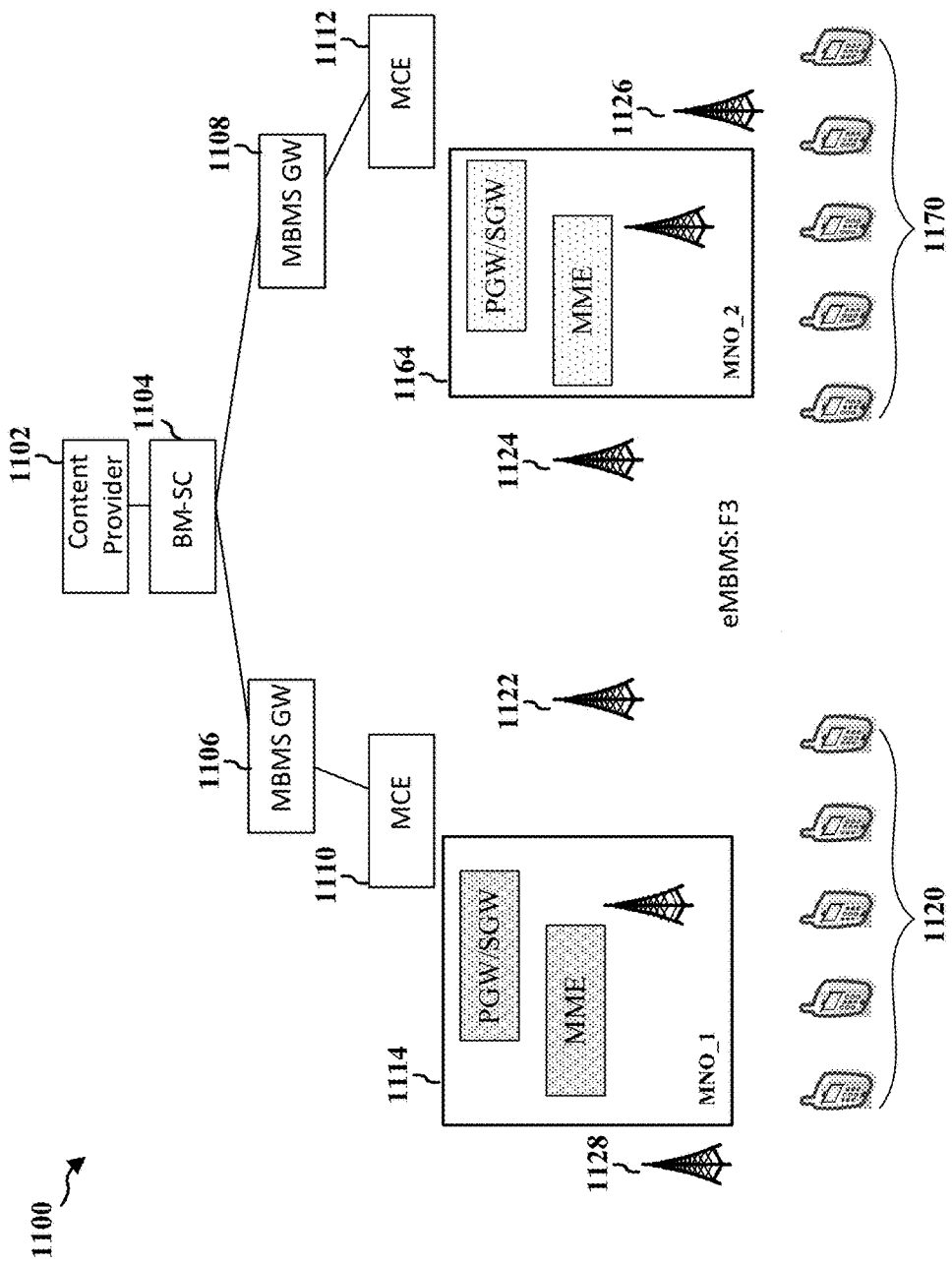
FIG. 11 is a diagram illustrating an example of a shared broadcast network architecture.

FIG. 11 is a diagram 1100 illustrating an example of a shared broadcast network architecture. In one configuration, a content provider 1102 or a third party (not shown) may have deployed a complete eMBMS network including BM-SC 1104, MBMS Gateways 1106 and 1108, MME (not shown), MCEs 1110 and 1112, and eNBs 1122, 1124, 1126, and 1128. For example and in one configuration, content is sent over eMBMS on the content provider 1102 or third party eMBMS only network. In one configuration, the content is sent to UEs 1120 and 1170 over a shared carrier F3 without involvement of the MNO network 1114 or 1164 (MNO_1 and MNO_2, respectively). In one configuration, the shared broadcast network may allow an MCE (e.g., 1110 or 1112) to communicate with eNBs (e.g., 1122-1128) directly instead of passing through from the MME per current eMBMS architecture. The UEs 1120 and 1170 may include UEs subscribed to the MNO network 1114, UEs subscribed to the MNO network 1164, UEs subscribed to other MNO networks, and/or UEs that have no cellular subscription to any MNO. All the UEs can access shared carrier F3 to receive eMBMS services.

In one configuration, the shared broadcast network may deploy MBSFN on F3, which may be a standalone eMBMS carrier. In one configuration, the content provider 1102 can enable service protection if there is an uplink channel. In one configuration, the broadcast content sent on the shared carrier F3 can also be accessed by subscribers from other MNOs and subscribers without any subscriptions to an MNO.

Figure 12:
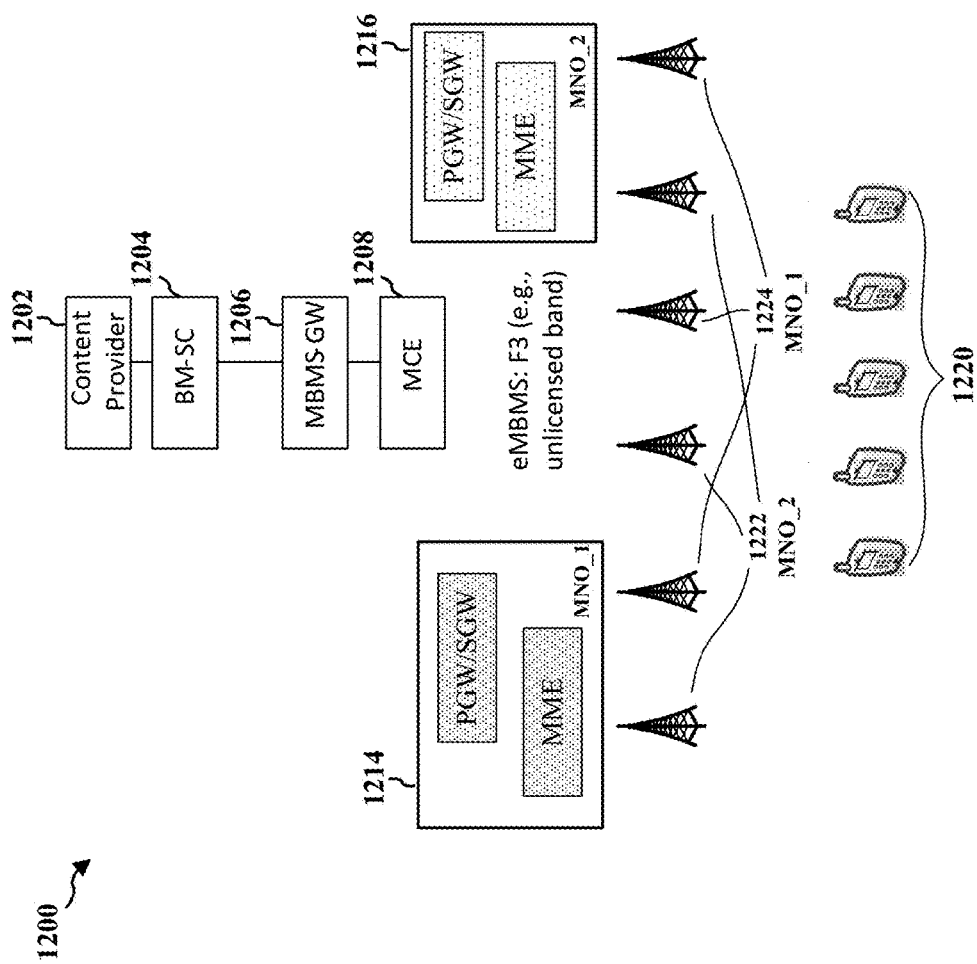
FIG. 12 is a diagram illustrating an example of shared broadcast network architecture.

FIG. 12 is a diagram 1200 illustrating an example of a shared broadcast network architecture. In one configuration, the shared broadcast network is a MNO coordinated SFN for content provider 1202. The BM-SC 1204, MBMS Gateway 1206, and MCE 1208 can be shared by MNOs (e.g., MNO networks 1214 and 1216), can be owned by a third party (not shown), or can be owned by the content provider 1202. The MNO network 1214 (MNO_1) operates eNBs 1224. The MNO network 1214 may provide unicast services on F1. The MNO network 1216 (MNO_2) operates eNBs 1222. The MNO network 1216 may provide unicast services on F2.

For example, in one configuration, content is sent over the MNO's (e.g., 1214 or 1216) eMBMS eNBs (e.g., 1224 or 1222, respectively) as one MBSFN. In one configuration, the content is sent to UEs 1220 over a shared carrier F3. For example, an unlicensed frequency band or a licensed frequency band owned by a third party or the content provider 1202 may be used to provide the shared carrier F3. The UEs 1220 may include UEs subscribed to the MNO network 1214, UEs subscribed to the MNO network 1216, UEs subscribed to other MNO networks, and/or UEs that have no cellular subscription to any MNO. One example of use cases of this configuration is in a stadium, where the different MNOs' subscribers can access carrier F3 to receive eMBMS service for the venue (such as NFL games, etc). This avoids the same content sent duplicated over different MNO's networks.

In one configuration, the shared carrier F3 may be a standalone eMBMS carrier. In one configuration, the content provider 1202 can enable service protection. In one configuration, the broadcast content sent on the shared carrier F3 can also be accessed by subscribers from other MNOs and subscribers without any subscriptions to an MNO.

Figure 13:
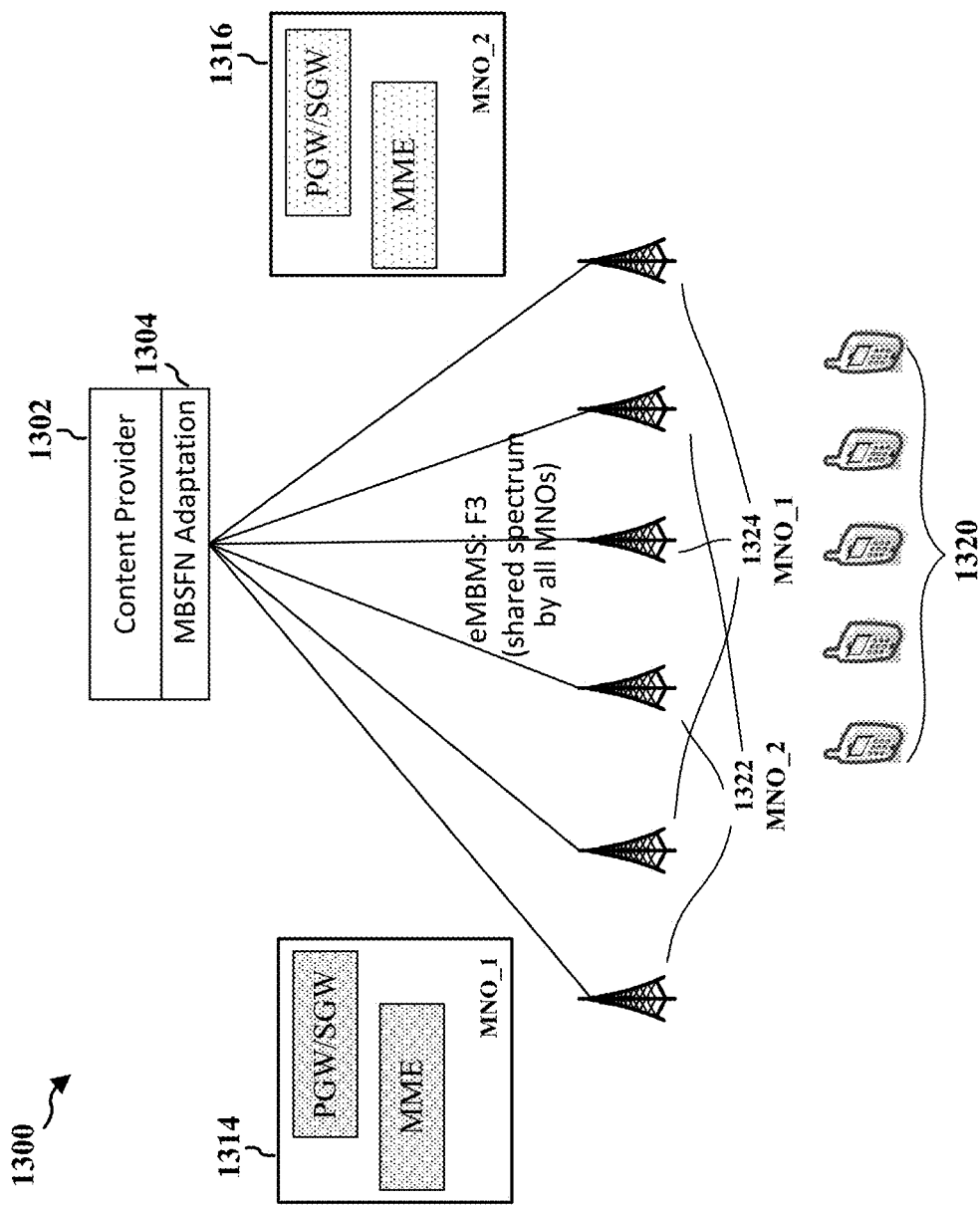
FIG. 13 is a diagram illustrating an example of shared broadcast network architecture.

FIG. 13 is a diagram 1300 illustrating an example of shared broadcast network architecture. In one configuration, the shared broadcast network is a simplified eMBMS network similar to a digital TV network. Content provider 1302 may send content to the eNBs (e.g., 1322 and 1324). In one configuration, a distributed MCE (not shown) is co-located with the eNBs.

In one configuration, without a BM-SC, MBMS user data flow synchronization is achieved through MBSFN Adaptation 1304. A MBSFN can be implemented across eNBs owned by different MNOs (e.g., MNOs 1314 and 1316) and/or the content provider 1302 and/or a third party (not shown). The MNO 1314 (MNO_1) operates eNBs 1324. The MNO network 1314 may provide unicast services on F1. The MNO 1316 (MNO_2) operates eNBs 1322. The MNO network 1316 may provide unicast services on F2. In one configuration, the protocol stack to receive eMBMS service may not have a complete service layer/middleware (e.g., MPEG-2 transport stream (TS) over an eMBMS physical layer/MAC/RLC or MPEG-2 TS over IP over eMBMS physical layer/MAC/RLC). In one configuration, a service definition for the TV program may use an eMBMS user service description (USD).

For example, in one configuration, content is sent over the MNO's (e.g., 1314 or 1316) eMBMS eNBs (e.g., 1324 or 1322, respectively) as one MBSFN. In one configuration, the content is sent to UEs 1320 over a carrier F3 shared by all MNOs (e.g., 1314 and 1316). The UEs 1320 may include UEs subscribed to the MNO network 1314, UEs subscribed to the MNO network 1316, UEs subscribed to other MNO networks, and/or UEs that have no cellular subscription to any MNO. All the UEs can access shared carrier F3 to receive eMBMS services.

In one configuration, the shared carrier F3 may be a standalone eMBMS carrier. In one configuration, the broadcast content sent on the shared carrier F3 can also be accessed by subscribers from other MNOs and subscribers without any subscriptions to an MNO.

In one configuration of the shared broadcast network, content is sent over an eMBMS channel of a shared carrier. In one configuration, the shared carrier may be an eMBMS SDL carrier. In another configuration, the shared carrier may be a standalone carrier. For a SDL carrier, the control information for the MBMS service may be sent over a PCell of a MNO. Therefore, the UE may support multiple frequency bands for MBMS reception on the SDL carrier. In one configuration, the UE may support a common search space on the PCell for receiving eMBMS on the shared SDL carrier. For the standalone shared carrier, all eMBMS control information may be sent over the standalone shared carrier. In one configuration, the shared broadcast network enables MBMS access and reception to be controlled by a MNO if controlling the UE from receiving the eMBMS on shared spectrum is desirable. In one configuration, a TMGI, used to identify the MBMS service is decoupled from MNOs. In one configuration, the same TMGI may be used to identify the content in every MNO network. In one configuration, 3GPP limited unicast access is enabled through a MNO for MBMS provisioning.

In one configuration, an eMBMS dedicated/shared carrier may be a SDL carrier. The SDL carrier may not support upper layer signaling (e.g., unicast signaling). Therefore, a UE may need to acquire the MBMS service through a PCell of a MNO. This PCell may be accessed by the UEs without associated MNO subscriptions. In one configuration, the SIB2 carrying information for MBSFN-SubframeConfig on the eMBMS dedicated SDL carrier may not be needed as all subframes are used for MBSFN. In one configuration, the SIB2 carrying information for MBSFN-SubframeConfig on the eMBMS SDL carrier may be needed if some subframes are not used for MBSFN. In one configuration, SIB13 and Physical Downlink Control Channel (PDCCH) notification on eMBMS dedicated SDL carrier may be sent from a PCell of a MNO.

In one configuration, SIB13 for the MBSFN-dedicated SDL carrier is sent on a PCell of a MNO, using the same message format as a traditional SIB13. The IE SystemInformationBlockType13 contains the information used to acquire the MBMS control information associated with one or more MBSFN areas.

| SystemInformationBlockType13 information element |
| --- |
| SystemInformationBlockType13-r9 ::=   SEQUENCE { <br> mbsfn-AreaInfoList-r9                MBSFN-AreaInfoList-r9, <br> notificationConfig-r9                MBMS-NotificationConfig-r9, <br> lateNonCriticalExtension             OCTET STRING <br> ... <br> } |

The IE MBSFN-AreaInfoList contains the information used to acquire the MBMS control information associated with one or more MBSFN areas.

| MBSFN-AreaInfoList information element |
| --- |
| MBSFN-AreaInfoList-r9 ::= SEQUENCE (SIZE(1..maxMBSFN-Area)) OF MBSFN-AreaInfo-r9 <br> MBSFN-AreaInfo-r9 ::=        SEQUENCE { <br>   mbsfn-AreaId-r9                  INTEGER (0..255), <br>   non-MBSFNregionLength            ENUMERATED {s1, s2}, -- always set to s0 <br>   notificationIndicator-r9         INTEGER (0..7), <br>   mcch-Config-r9                   SEQUENCE { <br>     mcch-RepetitionPeriod-r9       ENUMERATED {rf32, rf64, rf128, rf256}, <br>     mcch-Offset-r9                 INTEGER (0..10), <br>     mcch-ModificationPeriod-r9     ENUMERATED {rf512, rf1024}, <br>     sf-AllocInfo-r9                BIT STRING (SIZE(6)), -- always set to 10 <br>     signallingMCS-r9               ENUMERATED {n2, n7, n13, n19} <br>   }, <br>   ... <br> } |

The IE MBMS-NotificationConfig specifies the MBMS notification related configuration parameters that are applicable for all MBSFN areas.

| MBMS-NotificationConfig information element |
| --- |
| MBMS-NotificationConfig-r9 ::=    SEQUENCE { <br>   notificationRepetitionCoeff-r9  ENUMERATED {n2, n4}, <br>   notificationOffset-r9           INTEGER (0..10), <br>   notificationSF-Index-r9         INTEGER (1..6) - can be increased to 10 but may not be necessary - note this is to allow PDCCH notification sent on non-MBSFN subframe which is needed as primary carrier (PCell) may not even support MBSFN <br> } |

In one configuration, the SIB13 for the eMBMS-dedicated SDL carrier may include: i) center frequency of the SDL carrier and downlink bandwidth associated with the SDL carrier; and ii) symbol timing, subframe timing and system frame number. When there are multiple eMBMS dedicated carriers present, the updated SIB13 may be needed for each carrier.

In one configuration, the updated SIB13 may be structured as follows: SIB13 for mixed carrier; center frequency 1, downlink bandwidth for center frequency 1, symbol timing for center frequency 1, subframe timing for center frequency 1, system frame number and corresponding SIB13; center frequency 2, downlink bandwidth for center frequency 2, symbol timing for center frequency 2, subframe timing for center frequency 2, system frame number and corresponding SIB13 . . . . In another configuration, a new SIB may be used to contain the following: center frequency 1, downlink bandwidth for center frequency 1, symbol timing for center frequency 1, subframe timing for center frequency 1, system frame number and corresponding SIB13; center frequency 2, downlink bandwidth for center frequency 2, symbol timing for center frequency 2, subframe timing for center frequency 2, system frame number and corresponding SIB13 . . . .

In one configuration, another flag may be added in SIB15 to indicate the carrier is an eMBMS-dedicated carrier. In one configuration, MCH Scheduling Information (MSI) is changed to allow beyond 60% (or up to 100%) frequency allocation for a maximum of 2560 subframe possibilities (previously is 2560*60%=1536), as illustrated below.

| PMCH-InfoList information element |
|---|
| ```
PMCH-InfoList-r9 ::= SEQUENCE (SIZE (0..maxPMCH-PerMBSFN)) OF PMCH-
Info-r9
PMCH-Info-r9 ::=          SEQUENCE {
  pmch-Config-r9              PMCH-Config-r9,
  mbms-SessionInfoList-r9     MBMS-SessionInfoList-r9,
  ...
}
MBMS-SessionInfoList-r9 ::= SEQUENCE (SIZE (0..maxSessionPerPMCH)) OF
MBMS-SessionInfo-r9
MBMS-SessionInfo-r9 ::=   SEQUENCE {
  tmgi-r9                     TMGI-r9,
  sessionId-r9                OCTET STRING (SIZE (1))
  logicalChannalIdentity-r9   INTEGER (0..maxSessionPerPMCH-1),
  ...
}
PMCH-Config-r9 ::=        SEQUENCE {
  sf-AllocEnd-r9              INTEGER (0..2559),
  dataMCS-r9                  INTEGER (0..28),
  mch-SchedulingPeriod-r9     ENUMERATED {
                              rf8, rf16, rf32, rf64, rf128, rf256, rf512,
  rf1024},
  ...
}
``` |

FIG. 14 is a diagram 1400 illustrating an example of MSI MAC control element and a table 1450 illustrating possible values of the logical channel id (LCID) field within the MSI MAC control element. As illustrated in diagram 1400, each MTCH is defined by a LCID field and a Stop MTCH field. The 5-bit LCID is the logical channel id of a MTCH. Different values of LCID may have different indications regarding the MTCH, as shown in table 1450.

Traditionally, the Stop MTCH is 11 bits long. The Stop MTCH field indicates the ordinal number of the subframe within the MCH Scheduling Period (MSP). The value of Stop MTCH counts MCH subframes. Value 2047 of Stop MTCH indicates the corresponding MTCH is not scheduled. Values 2043 to 2046 of Stop MTCH are reserved. In one configuration, the Stop MTCH field may be extended to allow 2560 subframes possibilities by extending the MTCH field to 12 bits.

In one configuration, there may be synchronization among shared SDL cells to provide SFN. In one configuration, SIB information may indicate up to 100% allocation of MBSFN subframes for the shared SCell for MBMS service. In one configuration, SIB information may indicate a time offset between the PCell and the shared SCell. In one configuration, the SIB13 and the PDCCH notification on the eMBMS shared SDL carrier are sent from the primary carrier. In an alternative configuration, the shared MBMS SDL carrier information can be sent over an IP connection.

For a Broadcast TV receiver, sending content over a shared standalone eMBMS carrier may be more desirable if the receiver uses eMBMS carrier(s) for receiving eMBMS. In one configuration, the shared broadcast network with a standalone carrier utilizes the entire bandwidth of the standalone carrier for broadcast TV. In one configuration, there is no uplink bandwidth or very limited uplink bandwidth for unicast interactive traffic (for example, MBMS provisioning, etc). There may be no base carrier (MNO) to be attached to because all control information can be sent over the standalone carrier.

In one configuration, the shared broadcast network with a standalone carrier performs one or more of the primary synchronization signal (PSS), the second synchronization signal (SSS), the physical broadcast channel (PBCH), or SIB transmission. In another configuration, the shared broadcast network with a standalone carrier keeps PBCH/SIB transmission without transmission of PSS/SSS. In one configuration, the shared broadcast network with a standalone carrier allows time-division multiplexing (TDM) or frequency-division multiplexing (FDM) between PSS/SSS/PBCH/SIB and PMCH. In another configuration, the shared broadcast network with a standalone carrier allows TDM or FDM between PBCH/SIB and PMCH.

In one configuration, one SIB (e.g., SIB13 or a new SIB) carries all necessary information for the shared broadcast network with a standalone carrier. In one configuration, semi-static SIB scheduling linked to bandwidth of the standalone carrier can be applied for MBMS signaling. In one configuration, different MBSFN areas can support different Cyclic Prefix (CP) lengths and such information is indicated in the SIB for the shared broadcast network with a standalone carrier. In one configuration, a different subframe structure can be introduced for different CP length for the shared broadcast network with a standalone carrier. In one configuration, the SIB may indicate the associated CP length for each MCCH and MBSFN area. In one configuration, the shared broadcast network with a standalone carrier may enable configuration of uplink subframes. The upper layer procedure (MAC/RRC) may remain the same for the shared broadcast network with a standalone carrier.

A UE may not be able to acquire an MBSFN area ID directly because each cell can belong up to 8 MBSFN areas. In one configuration, the shared broadcast network with a standalone carrier keeps the acquisition signal the same as the traditional PSS/SSS for physical cell identity (PCI) detection. Each cell transmits its associated MBSFN areas in SIB. In one configuration, PBCH may be needed for SFN and bandwidth information. All the system and MBMS related information can be transmitted in one SIB. A UE may use these system and MBMS related information to acquire MCCH corresponding to each MBSFN area. In one configuration, these system and MBMS related information cannot be transmitted in traditional MBSFN fashion as the information can be for potentially multiple MBSFN areas. In one configuration, these system and MBMS related information can be transmitted once every X ms (for example, X=20). In one configuration, each cell can form the smallest MBSFN area and transmit these system and MBMS related information in the smallest MBSFN area and serve as the anchor MBSFN area for UE to acquire MCCH for the other MBSFN areas supported by the cell.

In one configuration of the shared broadcast network with a standalone carrier, no TDM unicast symbol may be needed for subframes that do not contain SIB information. In such a configuration, dynamic SIB scheduling that uses PDCCH in subframes containing SIB information may be used. Or semi-static SIB scheduling without using PDCCH can be introduced. The resource allocation and MCS can be a function of bandwidth.

Figure 15:
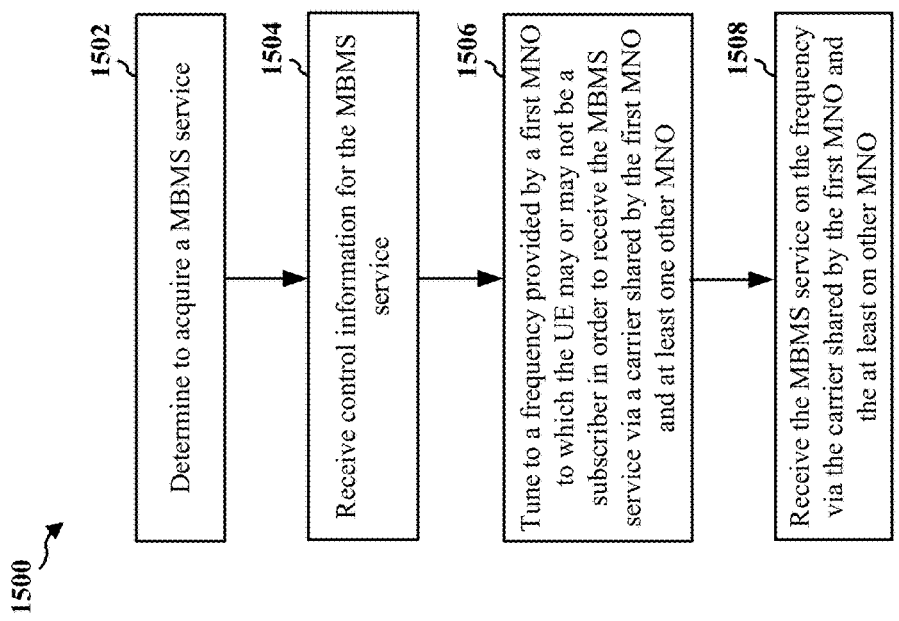
FIG. 15 is a flowchart of a method of wireless communication.

FIG. 15 is a flowchart 1500 of a method of wireless communication. Specifically, this method describes acquiring MBMS service via a shared carrier. The method may be performed by a UE (e.g., the UE 104, 350, 602/602', 652/652', the apparatus 1902/1902'). At 1502, the UE determines to acquire a MBMS service offered on a shared carrier. In one configuration, the UE determines to acquire the MBMS service in response to a user interface (UI) input. In another configuration, the UE determines to acquire the MBMS service in response to a previously scheduled event.

At 1504, the UE receives control information for the MBMS service. In one configuration, the UE may receive information associated with the MBMS service via limited unicast communication with the first MNO. The MBMS service may be received based on the received information.

At 1506, the UE tunes to a frequency provided by a first MNO to which the UE may or may not be a subscriber in order to receive the MBMS service via a carrier shared by the first MNO and at least one other MNO. As used herein, a carrier shared by multiple MNOs may also be referred to as a shared carrier among the multiple MNOs. In one configuration, the shared carrier has a common SFN timing with respect to the first MNO and the at least one other MNO. In one configuration, the shared carrier includes an unlicensed carrier. At 1508, the UE receives the MBMS service on the frequency via the carrier shared by the first MNO and the at least on other MNO. Traditionally, a UE is prevented from acquiring a service from a MNO to which the UE is not a subscriber. In one configuration, a MNO may agree to provide network access to a UE without a subscription to the MNO, e.g., via limited unicast service provided by a PCell and via a shared carrier provided by a SCell. In one configuration, the content may be encrypted (i.e. content protected) if the content provider wants to prevent unauthorized UEs from receiving the MBMS service via the shared carrier. In one configuration, online provisioning may be used to provision a decryption key to authorized UEs if needed.

In one configuration, the shared carrier includes a shared MBMS SDL carrier. In this configuration, the control information for the MBMS service is received through a PCell of the first MNO, and the MBMS service is received through a SCell shared by the first MNO and the at least one other MNO. The MBMS control information is received through a common search space of the PCell. The UE may further acquire a SIB (e.g., SIB13) indicating the frequency and a bandwidth associated with the shared MBMS SDL carrier. The UE may tune to the frequency based on the acquired SIB. The UE may acquire a SIB (e.g., SIB13) indicating an allocation of MBSFN subframes for the SCell. The MBMS service may be received based on the indicated MBSFN subframes in the acquired SIB. The UE may acquire a SIB (e.g., SIB13) indicating a time offset between the PCell and the SCell. The MBMS service may be received based on the indicated time offset in the acquired SIB. The UE may further receive a SIB13 and a PDCCH notification on the shared MBMS SDL carrier from the PCell. The MBMS service may be received based on the received SIB13 and the PDCCH notification.

In an alternative configuration, the UE may receive information regarding the shared MBMS SDL carrier through an IP connection. The UE may tune to the frequency and receive the MBMS service based on the received information regarding the shared MBMS SDL carrier.

In one configuration, the shared carrier may include a standalone shared carrier for receiving the MBMS service and control information associated with the MBMS service. In one configuration, the UE may receive a frame timing and a SIB via the standalone shared carrier without having previously received a PSS and a SSS via the standalone shared carrier. The details of this configuration will be further described below in FIG. 16. In one configuration, the shared carrier may include a MBSFN implemented by the first MNO and the at least one other MNO.

Figure 16:
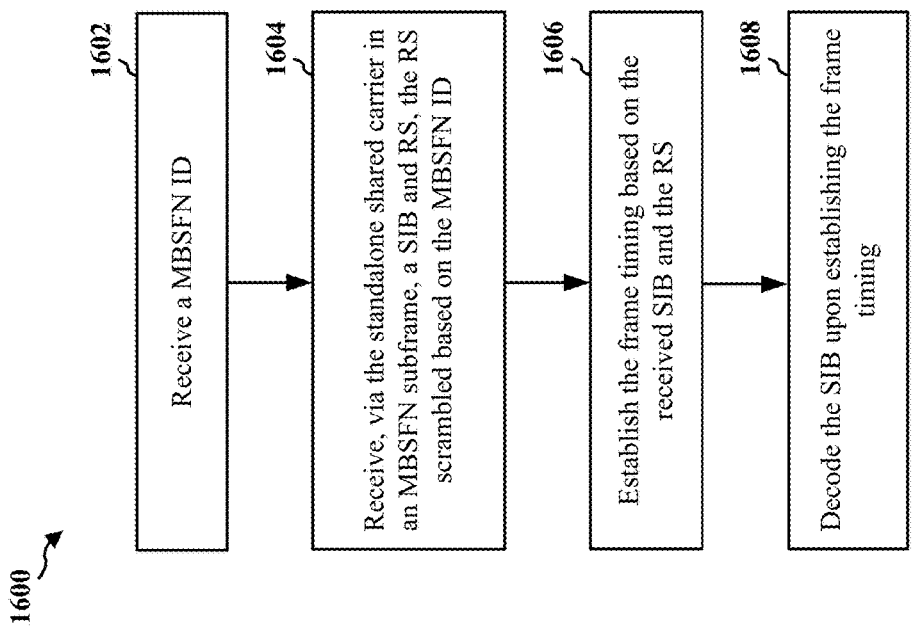
FIG. 16 is a flowchart of a method of wireless communication.

FIG. 16 is a flowchart 1600 of a method of wireless communication. Specifically, this method describes acquiring a frame timing and a SIB (e.g., a new SIB or SIB13) via the standalone shared carrier without having previously received a PSS and a SSS via the standalone shared carrier. In one configuration, the SIB is a new SIB that contains all control information, e.g., the combination of SIB1, SIB2, SIB13, SIB15, etc. The method may be performed by a UE (e.g., the UE 104, 350, 602/602', 652/652', the apparatus 1902/1902'). At 1602, the UE receives a MBSFN ID. In one configuration, the MBSFN ID is a well-known virtual MBSFN ID.

At 1604, the UE receives, via the standalone shared carrier in an MBSFN subframe, a SIB (e.g., a new SIB or SIB13) and reference signals (RSs). The RSs are scrambled based on the MBSFN ID. At 1606, the UE establishes the frame timing based on the received SIB and the RSs with different MBSFN ID hypotheses. For example, the SIB may be placed periodically in a known subframe relative to 10 ms frame timing. The UE may search for the SIB MBSFN ID to establish frame timing.

At 1608, the UE decodes the SIB and detects MBSFN ID upon establishing the frame timing. Once the UE finds the SIB pilot/RS, the UE knows that the signal is a broadcast signal and acquires the corresponding SIB information.

A MNO may control access by the MNO's UEs to certain MBMS services. If the broadcast content is sent over a different band/frequency, the MNO may configure the bands that are allowed or not allowed to be accessed by the MNO's subscribers (UEs) via configuring the subscriber identification module (SIM) of the UEs. If the broadcaster's contents and MNO's contents are sent on the same band/frequency, the MNO may configure the PLMN ID or services (TMGIs) that are allowed or not allowed to be accessed by its subscribers via SIM configuration. A MNO may prevent access to the eMBMS sent via the MNO's pipe by other MNOs' subscribers. This may be done by enabling service protection on the MNO's network.

In one configuration of the shared broadcast network, TMGI may be decoupled from MNOs. This may be accomplished through reusing the current TMGI format. In one configuration, a content provider may have a distinct TMGI space (e.g., content provider is allocated with its own mobile country code (MCC) or mobile network code (MNC)). In another configuration, the content provider may use different TMGI spaces from different cellular operators. The decoupling of TMGI from MNOs may also be accomplished through decoupling TMGI from MCC and MNC. This may result in unique TMGIs across the content providers.

In one configuration of the shared broadcast network, online provisioning may be performed. In one configuration, online provisioning may involve the process of preparing and equipping the network to provide services (e.g., MBMS) to UEs. In one configuration, the provisioning process monitors access rights and privileges to ensure the security of network resources and user privacy. In one configuration, a UE may be configured with application server information. The provisioning of the application may be performed over IP. The UE may identify means available to communicate with application server, e.g., 3GPP with 3GPP credentials, Wi-Fi, 3GPP limited access without 3GPP credentials, etc. The UE may decide on which access to use for unicast, based on available connections and configuration.

In one configuration of the shared broadcast network, limited unicast access through the MNO may be enabled for MBMS provisioning. The UE may be pre-configured with an Access Point Name (APN). The UE connects to the pre-configured APN. The network performs MBMS provisioning through this APN. During provisioning, the network disallows the UE to reconnect to this APN. In one configuration, the PDN gateway may indicate to the MME that "Reconnect to this APN is not allowed." The MME informs the UE using non-access stratum (NAS) signaling to indicate "Reconnection to this APN is not allowed." Upon receiving such indication, the UE is not allowed to reconnect to the APN until next power-cycle.

Figure 17:
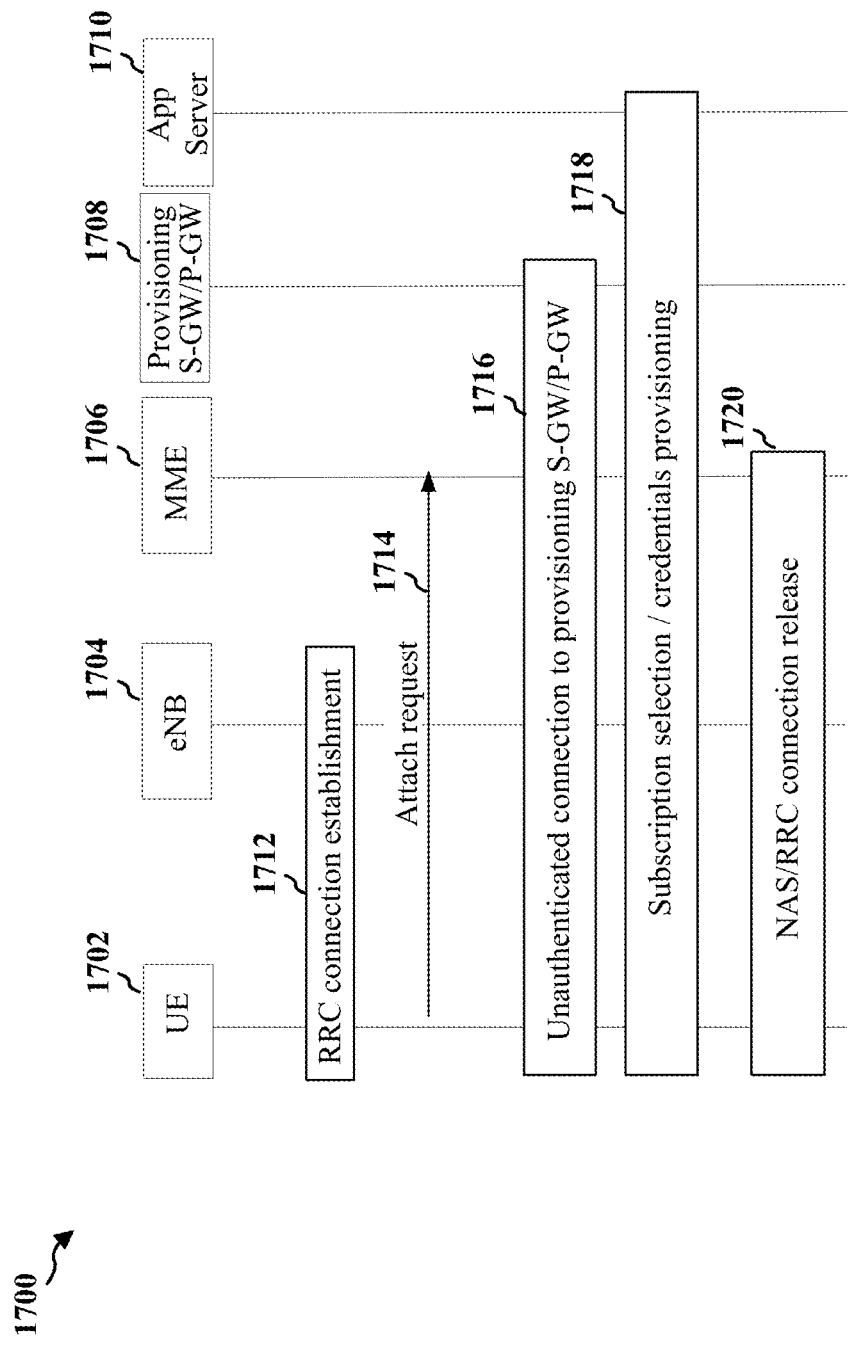
FIG. 17 is an example flow diagram illustrating 3GPP limited access for application online provisioning.

FIG. 17 is an example flow diagram 1700 illustrating 3GPP limited access for application online provisioning. Application online provisioning may provide necessary information (e.g., decryption key to the data) to receive the eMBMS. In one configuration, application online provisioning may also involve interactive services such as voting, reception report, etc. In order to obtain 3GPP limited access for application online provisioning, the UE 1702 establishes (at 1712) a RRC connection with the eNB 1704. At 1714, the UE 1702 sends an attach request with an APN for provisioning to the MME 1706. This APN may be a generic "provisioning" APN, or an "app-specific-provisioning" APN, e.g. "HBO-GO-Provisioning".

If the network supports online provisioning, the MME 1706 selects a specific Serving Gateway or PDN Gateway 1708 for provisioning, and establishes (at 1716) the unauthenticated connection to provisioning Serving Gateway or PDN Gateway 1708. In one configuration, the MME 1706 may start a timer when the unauthenticated connection is established. If the timer expires, the MME 1706 releases the connection and detaches the UE 1702.

In one configuration, the PDN Gateway 1708 offers a limited connection to a specific pool of application servers for the purpose of provisioning. Provisioning is performed e.g. over HTTPS. At 1718, the UE 1702 performs subscription selection or credentials provisioning with the application server 1710. After the provisioning is complete, the NAS/RRC connection is released at 1710. In one configuration, the NAS/RRC connection is released because either a timer for the connection in the MME 1706 expires or an inactivity timer in the eNB 1704 expires.

Figure 18:
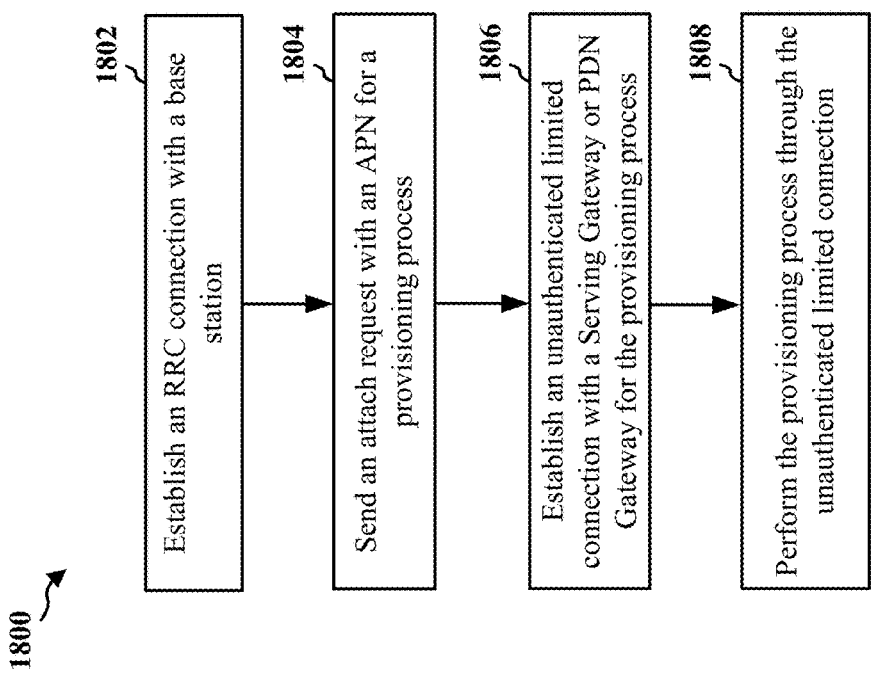
FIG. 18 is a flowchart of a method of wireless communication using 3GPP limited access for application online provisioning.

FIG. 18 is a flowchart 1800 of a method of wireless communication using 3GPP limited access for application online provisioning. The method may be performed by a UE (e.g., the UE 104, 350, 602/602', 652/652', the apparatus 1902/1902'). At 1802, the UE establishes an RRC connection with a base station.

At 1804, the UE send an attach request with an APN for a provisioning process. This APN may be a generic "provisioning" APN, or an "app-specific-provisioning" APN, e.g. "HBO-GO-Provisioning".

At 1806, the UE establishes an unauthenticated limited connection with a Serving Gateway or PDN Gateway for the provisioning process. In one configuration, the Serving Gateway or PDN Gateway is selected by a MME. In one configuration, the MME may start a timer when the unauthenticated connection is established. If the timer expires, the MME releases the connection and detaches the UE. In one configuration, the UE may be prompted to provide a certificate before the limited connection is granted. At 1808, the UE performs the provisioning process through the unauthenticated limited connection.

Figure 19:
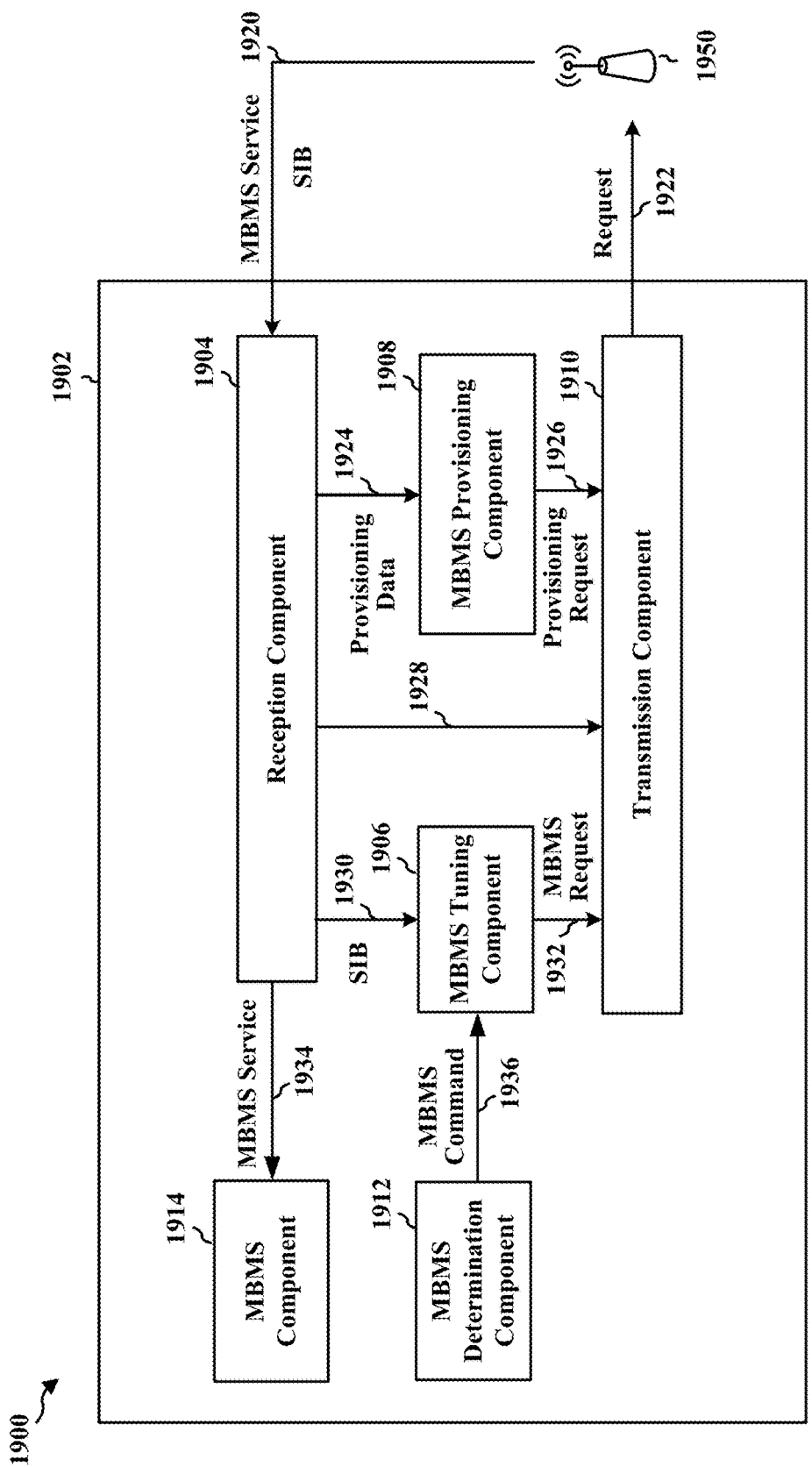
FIG. 19 is a conceptual data flow diagram illustrating the data flow between different modules/means/components in an exemplary apparatus.

FIG. 19 is a conceptual data flow diagram 1900 illustrating the data flow between different modules/means/components in an exemplary apparatus 1902. The apparatus 1902 may be a UE. The apparatus 1902 includes a reception component 1904 that is configured to receive MBMS service and corresponding control information (e.g., SIB) from a base station 1950 through data path 1920. The apparatus 1902 also includes a transmission component 1910 that is configured to transmit data and/or messages (e.g., provisioning request and MBMS request) to the base station 1950 through data path 1922. The reception component 1904 and the transmission component 1910 coordinate the communications of apparatus 1902 through data path 1928.

The apparatus 1902 may also include a MBMS component 1914 that is configured to receive MBMS service from the reception component 1904 through data path 1934. In one configuration, the MBMS component 1914 performs the operations described above at 1508 of FIG. 15. The apparatus 1902 may also include a MBMS determination component 1912 that is configured to determine to acquire a MBMS service. Once the determination to acquire MBMS service is made, the MBMS determination component 1912 sends a MBMS command to MBMS tuning component 1906 through data path 1936. In one configuration, the MBMS determination component 1912 performs the operations described above at 1502 of FIG. 15. The MBMS tuning component 1906 is configured to tune to a frequency provided by a first MNO to which the apparatus is not a subscriber in order to receive the MBMS service via a carrier shared by the first MNO and at least one other MNO. The MBMS tuning component 1906 performs its operations in response to the MBMS command received from the MBMS determination component 1912. The MBMS tuning component 1906 receives system information from the reception component 1904 via data path 1930 and performs its operations based on the received system information. The MBMS tuning component 1906 sends a MBMS request to the transmission component 1910 via data path 1932. In one configuration, the MBMS tuning component 1906 performs the operations described above at 1506 of FIG. 15 and in FIG. 16. The apparatus 1902 may also include a MBMS provisioning component 1908 that is configured to perform application online provisioning. The MBMS provisioning component 1908 receives application provisioning related data from the reception component 1904 via data path 1924. The MBMS provisioning component 1908 sends, via data path 1926, a provisioning request to the transmission component 1910 for forwarding to the base station 1950. In one configuration, the MBMS provisioning component 1908 performs the operations described above in FIG. 18.

The apparatus may include additional components that perform each of the blocks of the algorithm in the aforementioned flowcharts of FIGS. 15, 16, and 18. As such, each block in the aforementioned flowcharts of FIGS. 15, 16, and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
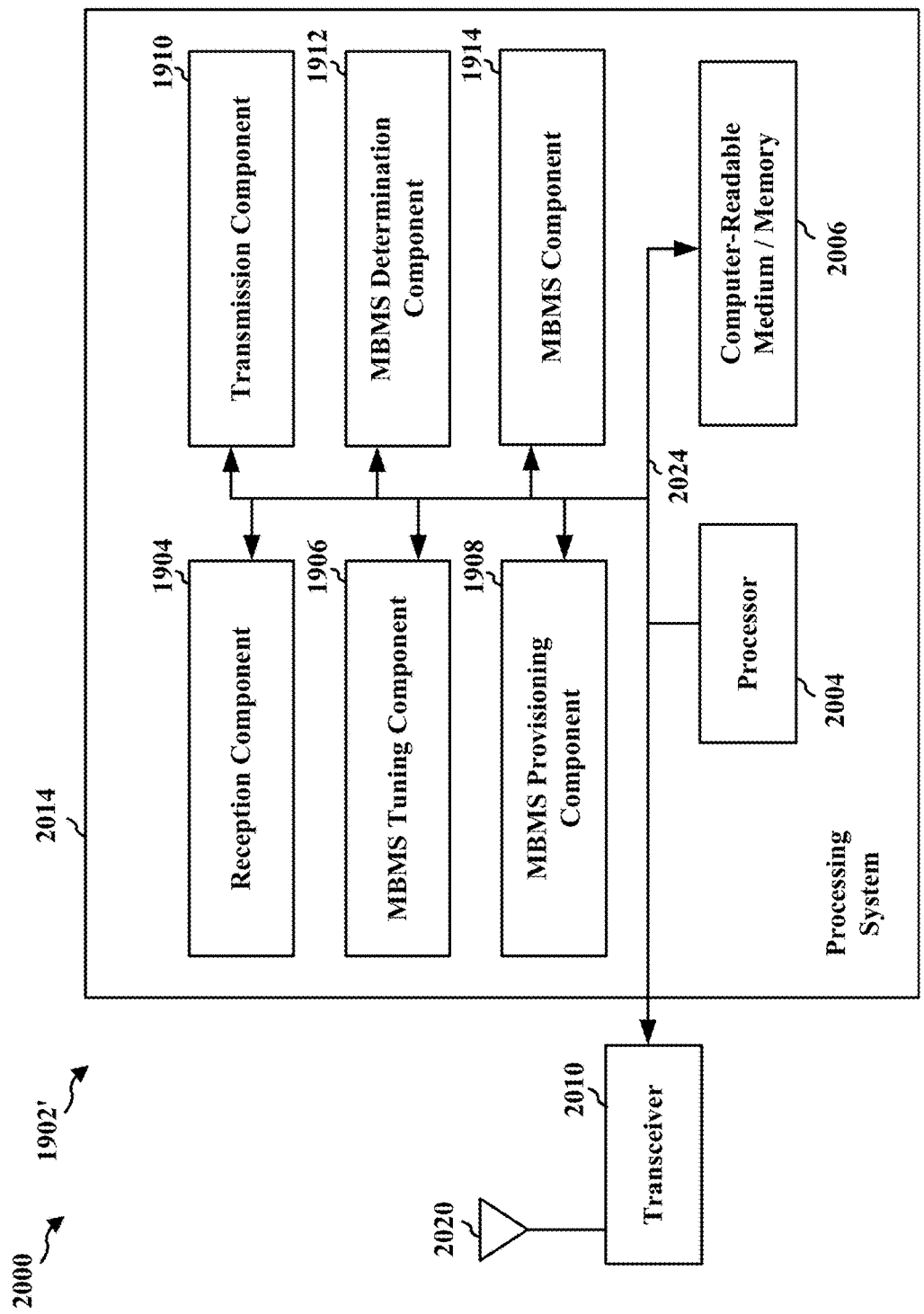
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, 1912, 1914 and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1910, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system further includes at least one of the components 1904, 1906, 1908, 1910, 1912, and 1914. The components may be software components running in the processor 2004, resident/stored in the computer readable medium/memory 2006, one or more hardware components coupled to the processor 2004, or some combination thereof. The processing system 2014 may be a component of the UE 350 and may include the memory 360 and/or at least one of the TX processor 368, the RX processor 356, and the controller/processor 359.

In one configuration, the apparatus 1902/1902' for wireless communication includes means for determining to acquire a MBMS service, means for tuning to a frequency provided by a first MNO to which the UE is not a subscriber in order to receive the MBMS service via a carrier shared by the first MNO and at least one other MNO, and means for receiving the MBMS service on the frequency via the carrier shared by the first MNO and the at least on other MNO.

In one configuration, the apparatus 1902/1902' may further include means for receiving control information for the MBMS service through a PCell of the first MNO. In such a configuration, the MBMS service is received through a SCell shared by the first MNO and the at least one other MNO. In one configuration, the apparatus 1902/1902' may further include means for acquiring a SIB indicating the frequency and a bandwidth associated with the shared MBMS SDL carrier. In such a configuration, the means for tuning is configured based on the acquired SIB. In one configuration, the apparatus 1902/1902' may further include means for acquiring a SIB indicating an allocation of MBSFN subframes for the SCell. In such a configuration, the MBMS service is received based on the indicated MBSFN subframes in the acquired SIB. In one configuration, the apparatus 1902/1902' may further include means for acquiring a SIB indicating a time offset between the PCell and the SCell. In such a configuration, the MBMS service is received based on the indicated time offset in the acquired SIB. In one configuration, the apparatus 1902/1902' may further include means for receiving a SIB13 and a PDCCH notification on the shared MBMS SDL carrier from the PCell. In such a configuration, the MBMS service is received based on the received SIB13 and the PDCCH notification. In one configuration, the apparatus 1902/1902' may further include means for receiving information regarding the shared MBMS SDL carrier through an IP connection. In such a configuration, the means for tuning and the means for receiving are configured based on the received information regarding the shared MBMS SDL carrier. In one configuration, the apparatus 1902/1902' may further include means for receiving information associated with the MBMS service via limited unicast communication with the first MNO. In such a configuration, the MBMS service is received based on the received information.

In one configuration, the apparatus 1902/1902' may further include means for receiving a frame timing and a SIB via the standalone shared carrier without having previously received a PSS and a SSS via the standalone shared carrier. In such a configuration, the means for receiving the frame timing and the SIB without having previously received the PSS and the SSS is configured to receive a MBSFN ID, receive a SIB and RS (the RS are scrambled based on the MBSFN ID), establish the frame timing based on the received SIB and the RS, and decode the SIB upon establishing the frame timing.

In one configuration, the apparatus 1902/1902' may further include means for establishing an RRC connection with a base station, means for sending an attach request with an APN for a provisioning process, means for establishing an unauthenticated limited connection with a Serving Gateway or PDN Gateway for the provisioning process, and means for performing the provisioning process through the unauthenticated limited connection.

The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In one configuration, the network (e.g., an eNB) provisions an eMBMS service via a shared carrier, provides control information for acquiring the shared carrier, and transmits the service. The shared carrier may be a standalone carrier or a shared dedicated MBMS carrier (e.g., a shared SDL carrier). In one configuration, the shared carrier may be a shared unlicensed spectrum carrier. In one configuration, the control information may be provided via limited unicast access to a PCell of a shared dedicated MBMS carrier. In one configuration, the control information may be provided via a SIB providing information necessary to acquire the service that is transmitted by the carrier. In one configuration, the control information may be provided via an IP connection. In one configuration, a MNO sharing the broadcast network may restrict access to the service via SIM configuration of that MNO's UEs.

Figure 21:
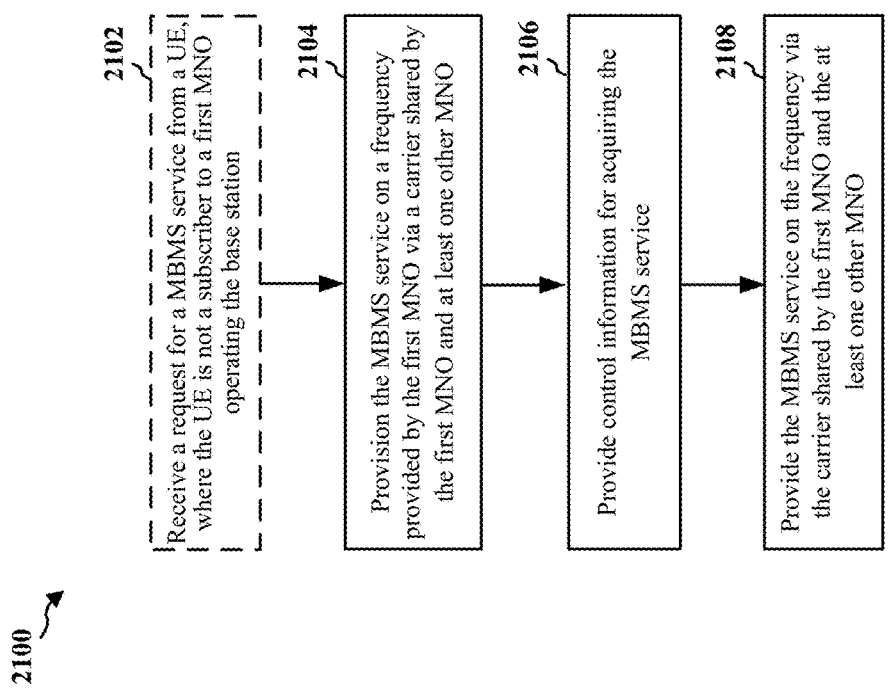
FIG. 21 is a flowchart of a method of wireless communication.

FIG. 21 is a flowchart 2100 of a method of wireless communication. Specifically, this method describes providing MBMS service via a shared carrier. The method may be performed by an eNB (e.g., the eNB 102, 310, 606, 656, or the apparatus 2202/2202'). At 2102, the eNB optionally receives a request for a MBMS service from a UE, where the UE is not a subscriber to a first MNO operating the eNB.

At 2104, the eNB provisions the MBMS service on a frequency provided by the first MNO via a carrier shared by the first MNO and at least one other MNO. In one configuration, the shared carrier has a common SFN timing with respect to the first MNO and the at least one other MNO. In one configuration, the shared carrier includes an unlicensed carrier.

At 2106, the eNB provides control information for acquiring the MBMS service. In one configuration, the eNB may provide control information associated with the MBMS service via limited unicast communication provided by the first MNO.

At 2108, the eNB provides the MBMS service on the frequency via the carrier shared by the first MNO and the at least one other MNO. Traditionally, a UE is prevented from acquiring a service from a MNO to which the UE is not a subscriber. In one configuration, a MNO may agree to provide network access to a UE without a subscription to the MNO, e.g., via limited unicast service provided by a PCell and through a shared carrier provided by a SCell.

In one configuration, the shared carrier includes a shared MBMS SDL carrier. In this configuration, the control information for the MBMS service is provided through a PCell of the first MNO, and the MBMS service is provided through a SCell shared by the first MNO and the at least one other MNO. The MBMS control information is provided through a common search space of the PCell. To establish the MBMS service, the eNB may transmit a SIB (e.g., SIB13) indicating the frequency and a bandwidth associated with the shared MBMS SDL carrier. The eNB may transmit a SIB (e.g., SIB13) indicating an allocation of MBSFN subframes for the SCell. The MBMS service may be provided based on the indicated MBSFN subframes in the transmitted SIB. The eNB may transmit a SIB (e.g., SIB13) indicating a time offset between the PCell and the SCell. The MBMS service may be provided based on the indicated time offset in the acquired SIB. The eNB may further transmit a SIB13 and a PDCCH notification on the shared MBMS SDL carrier through the PCell. The MBMS service may be provided based on the transmitted SIB13 and the PDCCH notification.

In one configuration, the shared carrier may include a standalone shared carrier for providing the MBMS service and control information associated with the MBMS service. In one configuration, the eNB may transmit a frame timing and a SIB via the standalone shared carrier without having previously transmitted a PSS and a SSS via the standalone shared carrier. In one configuration, in order to transmit a frame timing and a SIB via the standalone shared carrier without having previously transmitted a PSS and a SSS, the eNB may receive a MBSFN ID and transmit periodically, via the standalone shared carrier in an MBSFN subframe relative to a fixed fame timing, the SIB and RS. The RS are scrambled based on the MBSFN ID. In one configuration, the shared carrier may include a MBSFN implemented by the first MNO and the at least one other MNO.

Figure 22:
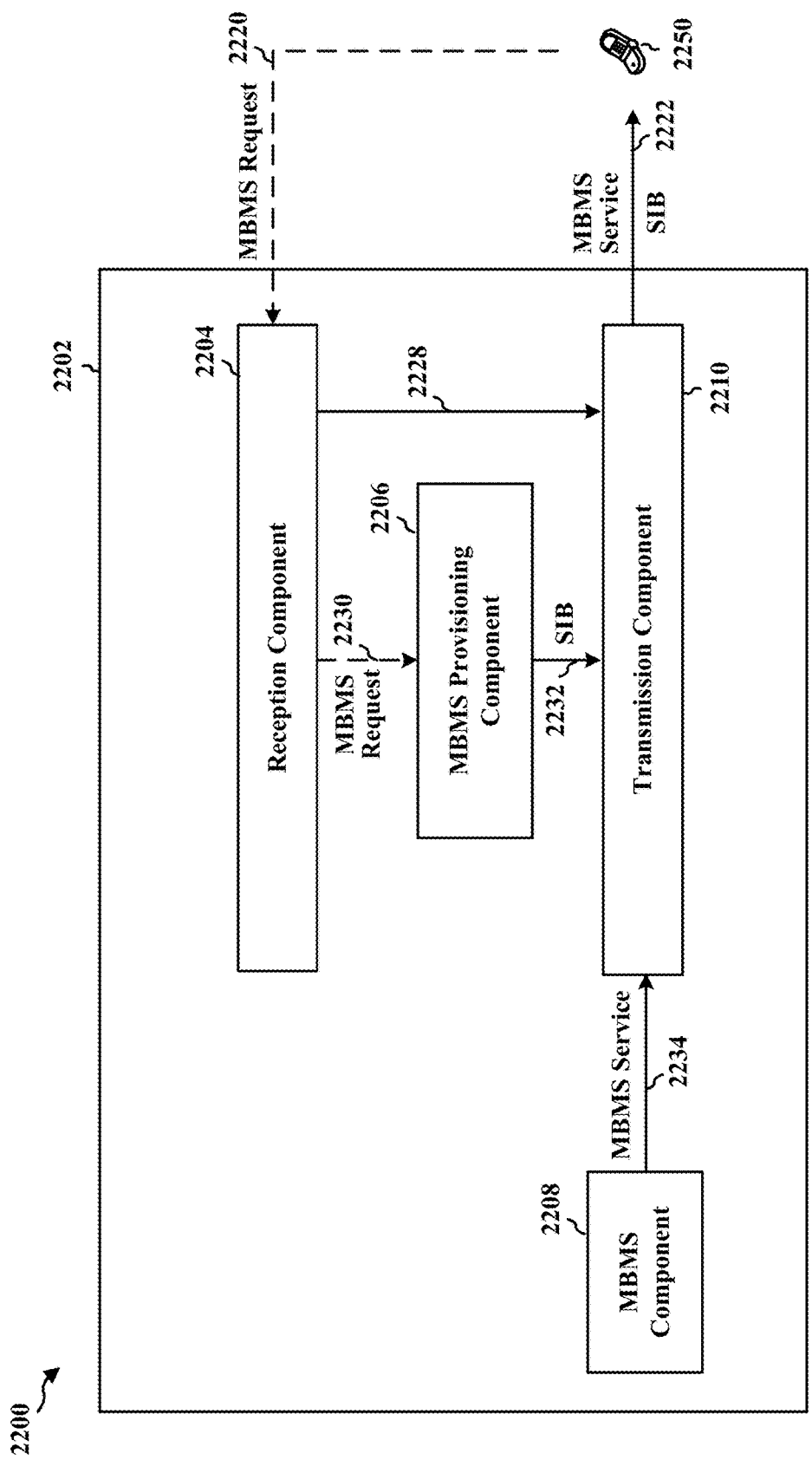
FIG. 22 is a conceptual data flow diagram illustrating the data flow between different modules/means/components in an exemplary apparatus.

FIG. 22 is a conceptual data flow diagram 2200 illustrating the data flow between different modules/means/components in an exemplary apparatus 2202. The apparatus may be an eNB. The apparatus 2202 includes a reception component 2204 that is configured to receive MBMS service request from a UE 2250 through data path 2220. The apparatus 2202 also includes a transmission component 2210 that is configured to transmit data and/or messages (e.g., MBMS service and SIB) to the UE 2250 through data path 2222. The reception component 2204 and the transmission component 2210 coordinate the communications of apparatus 2202 through data path 2228.

The apparatus 2202 may also include a MBMS provisioning component 2206 that may be configured to receive MBMS service request from the reception component 2204 through data path 2230. The MBMS provisioning component 2206 is configured to transmit SIB (e.g., SIB13) to the transmission component 2210 through data path 2232. In one configuration, the MBMS provisioning component 2206 performs the operations described above at 2104 and 2106 of FIG. 21. The apparatus 2202 may include a MBMS component 2208 that is configured to provide MBMS service to the transmission component 2210 through data path 2234. In one configuration, the MBMS component 2208 performs the operations described above at 2108 of FIG. 21.

The apparatus may include additional components that perform each of the blocks of the algorithm in the aforementioned flowcharts of FIG. 21. As such, each block in the aforementioned flowcharts of FIG. 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 23:
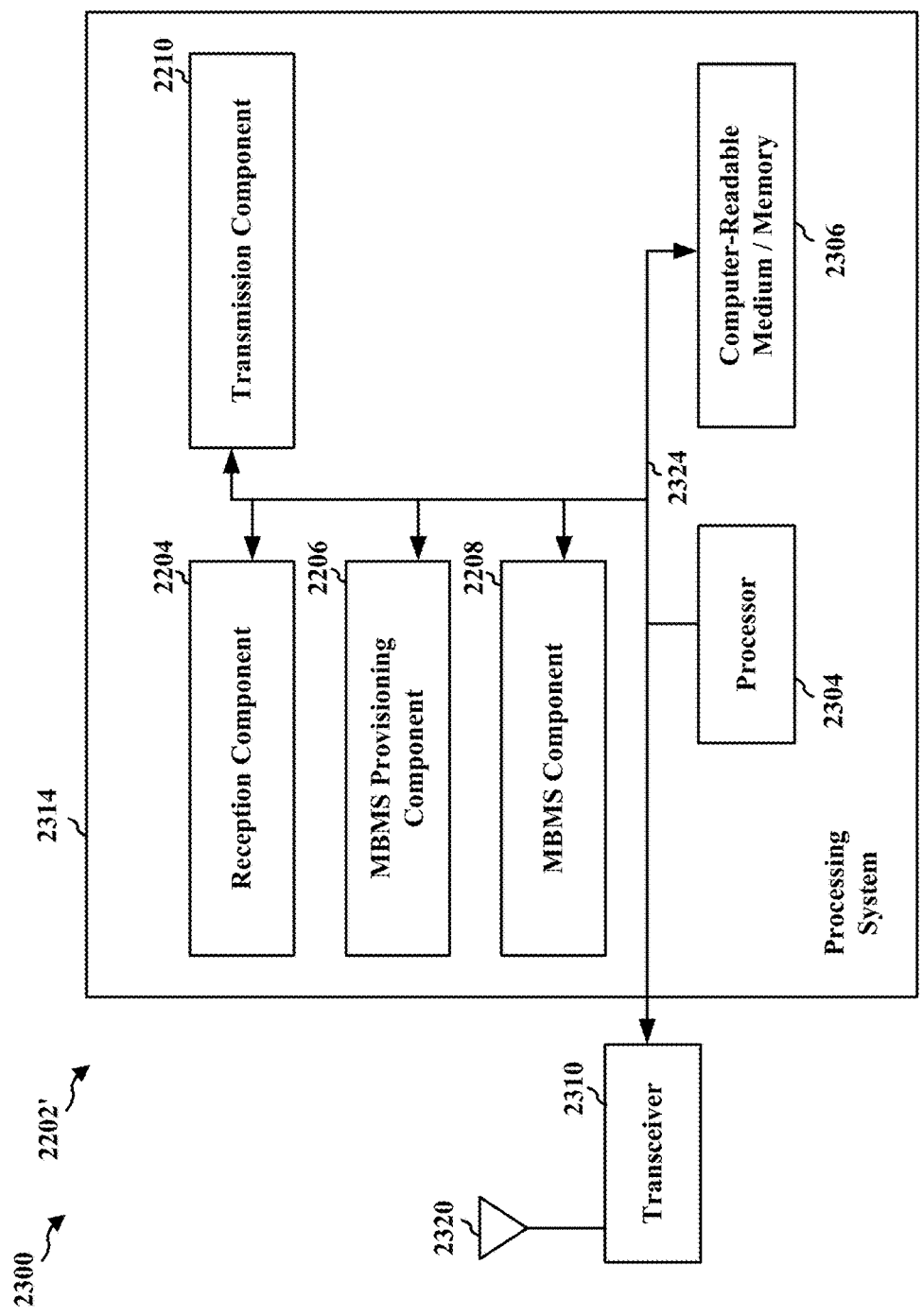
FIG. 23 is a diagram illustrating an example of a hardware implementation for an apparatus employing a processing system.

FIG. 23 is a diagram 2300 illustrating an example of a hardware implementation for an apparatus 2202' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware components, represented by the processor 2304, the components 2204, 2206, 2208, 2210, and the computer-readable medium/memory 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the reception component 2204. In addition, the transceiver 2310 receives information from the processing system 2314, specifically the transmission component 2210, and based on the received information, generates a signal to be applied to the one or more antennas 2320. The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described supra for any particular apparatus. The computer-readable medium/memory 2306 may also be used for storing data that is manipulated by the processor 2304 when executing software. The processing system further includes at least one of the components 2204, 2206, 2208, and 2210. The components may be software components running in the processor 2304, resident/stored in the computer readable medium/memory 2306, one or more hardware components coupled to the processor 2304, or some combination thereof. The processing system 2314 may be a component of the eNB 310 and may include the memory 376 and/or at least one of the TX processor 316, the RX processor 370, and the controller/processor 375.

In one configuration, the apparatus 2202/2202' for wireless communication includes means for receiving a request for a MBMS service from a UE, where the UE is not a subscriber to a first MNO operating the apparatus, means for provisioning the MBMS service on a frequency provided by the first MNO via a carrier shared by the first MNO and at least one other MNO; and means for providing the MBMS service on the frequency via the carrier shared by the first MNO and the at least one other MNO. In one configuration, the apparatus 2202/2202' further includes means for providing control information for the MBMS service through a PCell of the first MNO, where the MBMS service is provided through a SCell shared by the first MNO and the at least one other MNO.

The aforementioned means may be one or more of the aforementioned components of the apparatus 2202 and/or the processing system 2314 of the apparatus 2202' configured to perform the functions recited by the aforementioned means. As described supra, the processing system 2314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "component," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining to acquire a Multimedia Broadcast Multicast Service (MBMS) service;
   tuning to a frequency provided by a first mobile network operator (MNO) in order to receive the MBMS service via a carrier shared by the first MNO and at least one other MNO, wherein the UE is not a subscriber to the first MNO;
   receiving the MBMS service on the frequency via the carrier shared by the first MNO and the at least one other MNO, wherein the shared carrier comprises a standalone shared carrier for receiving the MBMS service and control information associated with the MBMS service; and
   receiving a frame timing and a system information block (SIB) via the standalone shared carrier without having previously received a primary synchronization signal (PSS) and a second synchronization signal (SSS) via the standalone shared carrier.

2. The method of claim 1, wherein the shared carrier further comprises a multicast-broadcast single-frequency network (MBSFN) implemented by the first MNO and the at least one other MNO.

3. A method of wireless communication, comprising:
   receiving a request for a Multimedia Broadcast Multicast Service (MBMS) service from a user equipment (UE), wherein the UE is not a subscriber to a first mobile network operator (MNO);
   provisioning the MBMS service on a frequency provided by the first MNO via a carrier shared by the first MNO and at least one other MNO, wherein the shared carrier comprises a standalone shared carrier for receiving the MBMS service and control information associated with the MBMS service;
   providing control information for acquiring the MBMS service, wherein providing the control information comprises transmitting a frame timing and a system information block (SIB) via the standalone shared carrier without having previously transmitted a primary synchronization signal (PSS) and a second synchronization signal (SSS) via the standalone shared carrier; and providing the MBMS service on the frequency via the carrier shared by the first MNO and the at least one other MNO.

4. The method of claim 3, wherein the shared carrier further comprises a multicast-broadcast single-frequency network (MBSFN) implemented by the first MNO and the at least one other MNO.

5. An apparatus for wireless communication, the apparatus being a user equipment (UE), comprising:
a memory; and
at least one processor coupled to the memory and configured to:
determine to acquire a Multimedia Broadcast Multicast Service (MBMS) service;
tune to a frequency provided by a first mobile network operator (MNO) in order to receive the MBMS service via a carrier shared by the first MNO and at least one other MNO, wherein the UE is not a subscriber to the first MNO;
receive the MBMS service on the frequency via the carrier shared by the first MNO and the at least one other MNO, wherein the shared carrier comprises a standalone shared carrier for receiving the MBMS service and control information associated with the MBMS service; and
receive a frame timing and a system information block (SIB) via the standalone shared carrier without having previously received a primary synchronization signal (PSS) and a second synchronization signal (SSS) via the standalone shared carrier.

6. The apparatus of claim 5, wherein the shared carrier further comprises a multicast-broadcast single-frequency network (MBSFN) implemented by the first MNO and the at least one other MNO.

7. An apparatus for wireless communication, comprising:
a memory; and
at least one processor coupled to the memory and configured to:
receive a request for a Multimedia Broadcast Multicast Service (MBMS) service from a user equipment (UE), wherein the UE is not a subscriber to a first mobile network operator (MNO);
provision the MBMS service on a frequency provided by the first MNO via a carrier shared by the first MNO and at least one other MNO, wherein the shared carrier comprises a standalone shared carrier for receiving the MBMS service and control information associated with the MBMS service;
provide control information for acquiring the MBMS service, wherein, to provide the control information, the at least one processor is configured to transmit a frame timing and a system information block (SIB) via the standalone shared carrier without having previously transmitted a primary synchronization signal (PSS) and a second synchronization signal (SSS) via the standalone shared carrier; and
provide the MBMS service on the frequency via the carrier shared by the first MNO and the at least one other MNO.

8. The apparatus of claim 7, wherein the shared carrier further comprises a multicast-broadcast single-frequency network (MBSFN) implemented by the first MNO and the at least one other MNO.

* * * * *